(12) United States Patent
Shrivastava et al.

(10) Patent No.: US 12,470,905 B2
(45) Date of Patent: Nov. 11, 2025

(54) METHODS AND APPARATUS FOR ENHANCED WiFi POSITIONING USING CIVIC LOCATION FOR 4G AND 5G

(71) Applicant: QUALCOMM Incorporated, San Diego, CA (US)

(72) Inventors: Avinash Shrivastava, Telangana State (IN); Stephen William Edge, Escondido, CA (US); Mukul Sharma, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 377 days.

(21) Appl. No.: 18/001,071

(22) PCT Filed: Jul. 28, 2021

(86) PCT No.: PCT/US2021/043565
§ 371 (c)(1),
(2) Date: Dec. 7, 2022

(87) PCT Pub. No.: WO2022/046346
PCT Pub. Date: Mar. 3, 2022

(65) Prior Publication Data
US 2023/0209322 A1    Jun. 29, 2023

(30) Foreign Application Priority Data

Aug. 24, 2020  (IN) .............................. 202021036289

(51) Int. Cl.
*H04W 4/90* (2018.01)
*H04W 4/029* (2018.01)

(52) U.S. Cl.
CPC ............. *H04W 4/90* (2018.02); *H04W 4/029* (2018.02)

(58) Field of Classification Search
CPC ....... H04W 4/90; H04W 40/29; H04W 4/029; H04W 4/20
(Continued)

(56) References Cited

U.S. PATENT DOCUMENTS

2006/0184680 A1    8/2006 Ruutu et al.
2007/0184845 A1    8/2007 Troncoso
(Continued)

OTHER PUBLICATIONS

International Search Report and Written Opinion—PCT/US2021/043565—ISA/EPO—Oct. 28, 2021.

*Primary Examiner* — Syed Haider
(74) *Attorney, Agent, or Firm* — Weaver Austin Villenueve & Sampson LLP

(57) ABSTRACT

During positioning of a user equipment (UE), for example, during an emergency call, a civic location of the UE may be determined. For example, during a location session in a wireless network, a UE may detect a WiFi access point (AP) and obtain the civic location of the WiFi AP from the AP. The UE may provide the civic location to a location server in the wireless network, which may treat the civic location as the civic location of the UE. The location server may validate the civic location using a geodetic location, e.g., obtained based on measurements from a satellite positioning system and/or base stations in the wireless network. The location server may further verify that the UE is proximate to the WiFi AP using WiFi positioning measurements performed by the UE. The validated civic location can be provided to an external client, e.g. a PSAP.

24 Claims, 13 Drawing Sheets

(58) Field of Classification Search
USPC .................................................. 455/404.2
See application file for complete search history.

(56) References Cited

U.S. PATENT DOCUMENTS

| | | | |
|---|---|---|---|
| 2013/0339478 A1* | 12/2013 | Edge | H04L 67/51 709/217 |
| 2015/0189485 A1* | 7/2015 | Levin | H04W 4/029 455/404.2 |
| 2016/0150574 A1* | 5/2016 | Edge | H04L 61/2564 455/404.2 |
| 2017/0041963 A1 | 2/2017 | Edge | |
| 2017/0055128 A1* | 2/2017 | Smith | G01S 19/48 |
| 2019/0297595 A1 | 9/2019 | Sirotkin et al. | |

* cited by examiner

METHODS AND APPARATUS FOR ENHANCED WiFi POSITIONING USING CIVIC LOCATION FOR 4G AND 5G

CLAIM OF PRIORITY

This application is a U.S. National Stage Application of International Application No. PCT/US2021/043565, filed Jul. 28, 2021, entitled "METHODS AND APPARATUS FOR ENHANCED WIFI POSITIONING USING CIVIC LOCATION FOR 4G AND 5G", which claims priority to India Application No. 202021036289, filed Aug. 24, 2020, entitled "METHODS AND APPARATUS FOR ENHANCED WIFI POSITIONING USING CIVIC LOCATION FOR 4G AND 5G," both of which are assigned to the assignee hereof, and incorporated by reference herein in their entirety.

BACKGROUND

Field

Subject matter disclosed herein relates to estimation of a location of a mobile device and more particularly to providing a civic location of a mobile device to a Public Safety Answering Point (PSAP) during an emergency call.
Information:

Wireless communication networks are widely deployed to provide various communication services such as voice, video, packet data, messaging, broadcast, and so on. A user may place an emergency call (e.g. E911) with a wireless network, which requires routing of the emergency call to a Public Safety Answering Point (PSAP) determined according to a location of the user. The location of a mobile device may be estimated based on information gathered from various systems and using different location solutions. For example, in a cellular network implemented according to Fourth Generation (4G) Long Term Evolution (LTE) or Fifth Generation (5G) New Radio (NR) radio access, for example, base stations may transmit positioning reference signals (PRS). A mobile device acquiring PRSs transmitted by different base stations may deliver signal-based measurements to a location server, which computes a location estimate of the mobile device using different positioning techniques, such as observed time difference of arrival (OTDOA), downlink time difference of arrival (DL-TDOA). round trip time (RTT), multi-cell RTT, angle of arrival (AOA), angle of departure (AOD), enhanced cell identity (E-CID), to name a few. Alternatively, a mobile device may compute an estimate of its location. Other position methods that may be used for a mobile device include use of a Global Navigation Satellite System (GNSS).

Positioning techniques employed by a mobile device in a cellular network, however, generate geodetic locations (i.e., latitude, longitude, and altitude), sometimes referred to as XY or XYZ coordinates, which is not preferred by PSAPs. A civic location, such as a street address, is typically preferred by PSAPs, e.g., for determining the correct public safety agency (or agencies) to dispatch and for more quickly having the dispatched public safety agency arrive at the location of the mobile device. Support of civic location for emergency calls, however, is no longer available using a network based solution, such as the National Emergency Address Database (NEAD) used previously in the United States, which has been decommissioned. Support of civic location for emergency calls may use a proprietary high level operating system (HLOS) based solution, which may not always be available or reliable. Accordingly, improvements in the support of civic location for emergency calls are desirable.

SUMMARY

During positioning of a user equipment (UE), for example, during an emergency call, a civic location of the UE may be determined. For example, during a location session in a wireless network, a UE may detect a WiFi access point (AP) and obtain the civic location of the WiFi AP from the AP. The UE may provide the civic location to a location server in the wireless network, which may treat the civic location as the civic location of the UE. The location server may validate the civic location using a geodetic location, e.g., obtained based on measurements from a satellite positioning system and/or base stations in the wireless network. The location server may further verify that the UE is proximate to the WiFi AP using WiFi positioning measurements performed by the UE. The validated civic location can be provided to an external client, e.g., a PSAP.

In one implementation, a method performed for a user equipment (UE) for supporting location services for the UE, includes receiving a request for location information from a location server in a wireless network for an emergency call; receiving from a WiFi access point a civic location for the WiFi access point; and sending to the location server the location information including the civic location to be sent to a Public Safety Answering Point (PSAP) for the emergency call.

In one implementation, a user equipment (UE) configured to support location services for the UE, includes at least one wireless transceiver configured to wirelessly communicate with a wireless network; at least one memory; and at least one processor coupled to the at least one wireless transceiver the at least one memory and configured to: receive, via the at least one wireless transceiver, a request for location information from a location server in the wireless network for an emergency call; receive, via the at least one wireless transceiver, from a WiFi access point a civic location for the WiFi access point; and send, via the at least one wireless transceiver, to the location server the location information including the civic location to be sent to a Public Safety Answering Point (PSAP) for the emergency call.

In one implementation, a user equipment (UE) configured to support location services for the UE, includes means for receiving a request for location information from a location server in a wireless network for an emergency call; means for receiving from a WiFi access point a civic location for the WiFi access point; and means for sending to the location server the location information including the civic location to be sent to a Public Safety Answering Point (PSAP) for the emergency call.

In one implementation, a non-transitory computer readable storage medium including program code stored thereon, the program code is operable to configure at least one processor in a user equipment (UE) to support location services for the UE, the program code includes instructions to receive a request for location information from a location server in a wireless network for an emergency call; program code to receive from a WiFi access point a civic location for the WiFi access point; and program code to send to the location server the location information including the civic location to be sent to a Public Safety Answering Point (PSAP) for the emergency call.

In one implementation, a method performed by a location server for supporting location services for a user equipment (UE) in a wireless network, includes sending a request for location information to the UE for an emergency call; receiving from the UE the location information comprising a civic location for a WiFi access point in wireless communication with the UE, wherein the civic location was received by the UE from the WiFi access point; and sending the civic location to a Public Safety Answering Point (PSAP) for the emergency call.

In one implementation, a location server configured to support location services for a user equipment (UE) in a wireless network, includes an external interface configured to wirelessly communicate with the wireless network; at least one memory; and at least one processor coupled to the external interface and the at least one memory and configured to: send, via the external interface, a request for location information to the UE for an emergency call; receive, via the external interface, from the UE the location information comprising a civic location for a WiFi access point in wireless communication with the UE, wherein the civic location was received by the UE from the WiFi access point; and send, via the external interface, the civic location to a Public Safety Answering Point (PSAP) for the emergency call.

In one implementation, a location server configured to support location services for a user equipment (UE) in a wireless network, includes means for sending a request for location information to the UE for an emergency call; means for receiving from the UE the location information comprising a civic location for a WiFi access point in wireless communication with the UE, wherein the civic location was received by the UE from the WiFi access point; and means for sending the civic location to a Public Safety Answering Point (PSAP) for the emergency call.

In one implementation, a non-transitory computer readable storage medium including program code stored thereon, the program code is operable to configure at least one processor in a location server to support location services for a user equipment (UE) in a wireless network, the program code comprising instructions to send a request for location information to the UE for an emergency call; program code to receive from the UE the location information comprising a civic location for a WiFi access point in wireless communication with the UE, wherein the civic location was received by the UE from the WiFi access point; and program code to send the civic location to a Public Safety Answering Point (PSAP) for the emergency call.

BRIEF DESCRIPTION OF THE FIGURES

Claimed subject matter is particularly pointed out and distinctly claimed in the concluding portion of the specification. However, both as to organization and/or method of operation, together with features and/or advantages thereof, it may best be understood by reference to the following detailed description if read with the accompanying drawings in which:

Figure 1:
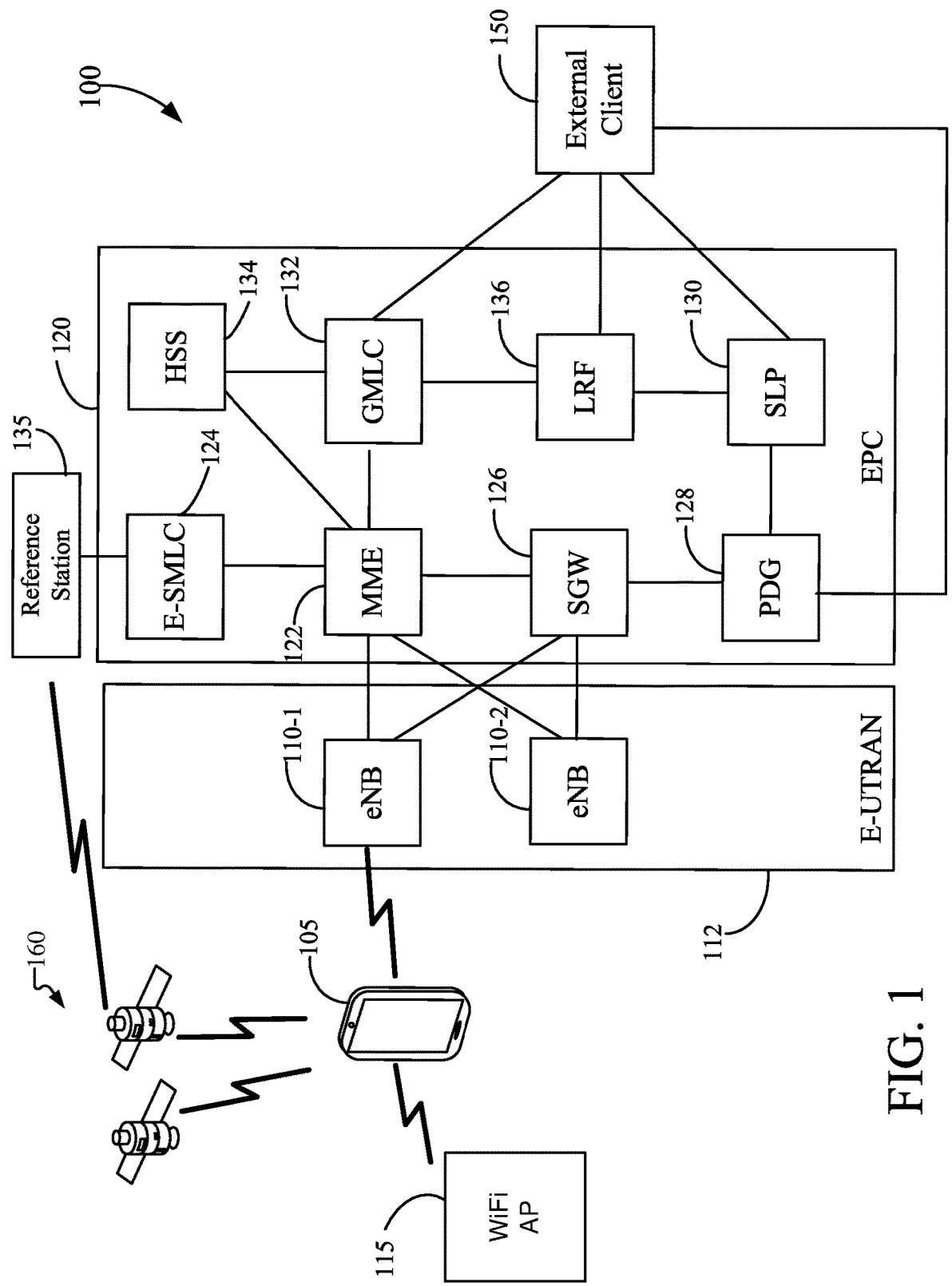
FIG. 1 is a diagram illustrating certain features of a Fourth Generation (4G) communication system comprising a mobile device and a cellular network.

Reference is made in the following detailed description to the above accompanying drawings, which form a part hereof, wherein like numeric and alphanumeric labels may designate like parts throughout that are identical, similar and/or analogous. In addition, multiple instances of an element may be indicated by following a first number for the element with a hyphen and a second number. For example, multiple instances of an element 210 may be indicated as 210-1, 210-2, 210-3 etc. When referring to such an element using only the first number, any instance of the element is to be understood (e.g. element 210 in the previous example would refer any of the elements 210-1, 210-2 and 210-3).

It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference RF signals the UE is measuring.

To support positioning of a UE, two broad classes of location solution have been defined: control plane and user plane. With control plane (CP) location, signaling related to positioning and support of positioning may be carried over existing network (and UE) interfaces and using existing protocols dedicated to the transfer of signaling. With user plane (UP) location, signaling related to positioning and support of positioning may be carried as part of other data using such protocols as the Internet Protocol (IP), Transmission Control Protocol (TCP) and User Datagram Protocol (UDP).

The Third Generation Partnership Project (3GPP) has defined control plane location solutions for UEs that use radio access according to Global System for Mobile communications GSM (2G), Universal Mobile Telecommunications System (UMTS) (3G), LTE (4G) and New Radio (NR) for Fifth Generation (5G). These solutions are defined in 3GPP Technical Specifications (TSs) 23.271 and 23.273 (common parts), 43.059 (GSM access), 25.305 (UMTS access), 36.305 (LTE access) and 38.305 (NR access). The Open Mobile Alliance (OMA) has similarly defined a UP location solution known as Secure User Plane Location (SUPL) which can be used to locate a UE accessing any of a number of radio interfaces that support IP packet access such as General Packet Radio Service (GPRS) with GSM, GPRS with UMTS, or IP access with LTE or NR.

Both CP and UP location solutions may employ a location server (LS) to support positioning. The LS may be part of or accessible from a serving network or a home network for a UE or may simply be accessible over the Internet or over a local Intranet. If positioning of a UE is needed, an LS may instigate a session (e.g. a location session or a SUPL session) with the UE and coordinate location measurements by the UE and determination of an estimated location of the UE. During a location session, an LS may request positioning capabilities of the UE (or the UE may provide them without a request), may provide assistance data to the UE (e.g. if requested by the UE or in the absence of a request) and may request a location estimate or location measurements from a UE, e.g. for the GNSS, OTDOA, DL-TDOA, AOD, Multi-RTT, and/or Enhanced Cell ID (ECID) position methods. Assistance data may be used by a UE to acquire and measure GNSS and/or PRS signals (e.g. by providing expected characteristics of these signals such as frequency, expected time of arrival, signal coding, signal Doppler).

In a UE based mode of operation, assistance data may also or instead be used by a UE to help determine a location estimate from the resulting location measurements (e.g., if the assistance data provides satellite ephemeris data in the case of GNSS positioning or base station locations and other base station characteristics such as PRS timing in the case of terrestrial positioning using, e.g., OTDOA, DL-TDOA, AOD, Multi-RTT, etc.).

In a UE assisted mode of operation, a UE may return location measurements to an LS which may determine an estimated location of the UE based on these measurements and possibly based also on other known or configured data (e.g. satellite ephemeris data for GNSS location or base station characteristics including base station locations and possibly PRS timing in the case of terrestrial positioning using, e.g., OTDOA, DL-TDOA, AOD, Multi-RTT, etc.).

During an emergency call, e.g., E911 calls dialed in the US, the call is routed to a Public Safety Answering Point (PSAP) based on a location of the UE. Positioning techniques employed in mobile wireless networks, however, typically generate geodetic locations (latitude, longitude, altitude), sometimes referred to as XY or XYZ coordinates, which is not preferred by PSAPs. A civic location (also referred to as a civic address), such as a street address, is preferred by PSAPs, e.g., for determining the correct agency (or agencies) to dispatch and for more quickly having the dispatched public safety agency arrive at the location of the UE. Support of civic location for emergency calls, however, is no longer available using a network based solution (NEAD), which has been decommissioned.

In one implementation, a UE may support civic location for emergency calls using a civic location obtained from a WiFi access point (AP). Under IEEE 802.11, which defines communications for wireless local area networks (WLANs), commonly referred to has WiFi (or Wi-Fi), a WiFi AP may transmit (e.g. may broadcast) its civic location. During a location session for a mobile wireless network, e.g., in a wireless wide area network (WWAN) for example such as a 4G network or a 5G network, particularly during an emergency sessions, a UE may detect a WiFi AP, e.g., may be camped on the WiFi AP or may scan for WiFi APs. The UE may obtain a civic location from a WiFi AP and may provide the civic location to a location server in the mobile wireless network. The location server may provide the civic location to the PSAP for the emergency call.

The civic location may typically be a civic location for the WiFi AP which may typically be configured in the WiFi AP by an owner or manager of the WiFi AP. This may not be so common for WiFi APs used privately in homes and apartments, but may be more common for WiFi APs used by an enterprise (e.g. at a shopping mall, airport, convention center, hotel, sports stadium, college or company campus, factory, government building etc.) as both an assistance in locating users and for assisting emergency calls. Although the civic location would belong to the WiFi AP and not the UE which receives the civic location from the WiFi AP, a proximity of the UE to the WiFi AP which may often be 50 meters or less due to a limitation on WiFi signaling range, may mean that the civic location is still a good approximation of the civic location of the UE and may in some cases be the same as the civic location of the UE.

The UE may further perform positioning measurements with respect to the WiFi AP, which may be used to provide a relative position of the UE with respect to the WiFi AP, e.g., the distance and direction of the WiFi AP from the UE, which may also be provided to the location server. By way of example, the UE may measure Received Signal Strength Indicator (RSSI), Round Trip Time (RTT), Angle of Arrival, or a combination thereof for the WiFi AP. The UE may further obtain positioning measurements using a satellite positioning system (SPS), base stations in the mobile wireless network, or a combination thereof, which may be provided to the location server. The location server may verify the civic location using one or more tests before sending the civic location to the PSAP. For example, the location server may validate the civic location by independently obtaining the UE geodetic location, e.g. based on the SPS and/or base station measurements, and verifying that the geodetic location is consistent with the civic location. The location server may additionally or alternatively verify the UE proximity to the WiFi AP, e.g., using the WiFi AP measurements, to determine whether the civic location is a good match for the UE. For example, the location server may verify whether the UE can be in the same building as the WiFi AP based on the relative position of the UE with respect to the WiFi AP. If the one or more tests to verify the validity of the civic location are passed, the location server may provide the civic location to the PSAP.

FIG. 1 is a diagram illustrating a communication system 100 that supports civic location for emergency calls for a user equipment (UE) 105 using LTE radio access (also referred to as wideband LTE) or Narrow Band Internet of Things (NB-IoT) radio access (also referred to as narrowband LTE), where NB-IoT and LTE may be as defined by 3GPP—e.g. in 3GPP Technical Specification (TS) 36.300. The communication system 100 may be referred to as an Evolved Packet System (EPS). As illustrated, the communication system 100 may include the UE 105, an Evolved Universal Mobile Telecommunications Service (UMTS) Terrestrial Radio Access (E-UTRA) Network (E-UTRAN) 112, and an Evolved Packet Core (EPC) 120. The E-UTRAN 112 and the EPC 120 may be part of a Visited Public Land Mobile Network (VPLMN) that is a serving network for the UE 105 and communicates with a Home Public Land Mobile Network (HPLMN) for the UE 105 (not shown in FIG. 1) or may be part of the HPLMN for UE 105. The E-UTRAN 112 and EPC 120 may interconnect with other networks. For example, the Internet may be used to carry messages to and from different networks or between different entities within a network, such as between the Packet Data Network Gateway (PDG) 128 that may be connected to the Serving Gateway (SGW) 126. For simplicity, these networks and associated entities and interfaces are not shown. As shown, the communication system 100 provides packet-switched services to the UE 105. However, as those skilled in the art will readily appreciate, the various concepts presented throughout this disclosure may be extended to networks providing circuit-switched services.

The UE 105 may comprise any electronic device configured for NB-IoT and/or LTE radio access, for example. The UE 105 may be referred to as a device, a wireless device, a mobile terminal, a terminal, a mobile station (MS), a mobile device, a SUPL Enabled Terminal (SET), or by some other name and may correspond to (or be part of) a smart watch, digital glasses, fitness monitor, smart car, smart appliance, cellphone, smartphone, laptop, tablet, PDA, tracking device, control device, or some other portable or moveable device. A UE 105 may comprise a single entity or may comprise multiple entities such as in a personal area network where a user may employ audio, video and/or data I/O devices and/or body sensors and a separate wireline or wireless modem. Typically, though not necessarily, a UE 105 may support wireless communication with one or more types of Wireless Wide Area Network (WWAN) such as a WWAN supporting Global System for Mobile Communications (GSM), Code Division Multiple Access (CDMA), Wideband CDMA (WCDMA), Long Term Evolution (LTE), Narrow Band Internet of Things (NB-IoT), Enhanced Machine Type Communications (eMTC) also referred to as LTE category M1 (LTE-M), High Rate Packet Data (HRPD), 5G New Radio (NR), WiMax, etc. EPC 120 combined with E-UTRAN 112 may be an example of a WWAN. A UE 105 may also support wireless communication with one or more types of Wireless Local Area Network (WLAN) such as a WLAN supporting IEEE 802.11 WiFi (also referred to as Wi-Fi) or Bluetooth® (BT). UE 105 may also support communication with one or more types of wireline network such as by using a Digital Subscriber Line (DSL) or packet cable for example. Although FIG. 1 shows only one UE 105, there may be many other UEs (e.g. hundreds, thousands or millions) that can each correspond to UE 105. Typically, the UE 105 has a single radio receiver (RF chain) which prevents or impedes location measurements by the UE 105 when in a connected state with the EPS in communication system 100.

The UE 105 may enter a connected state with a wireless communication network that may include the E-UTRAN 112 and EPC 120. In one example, UE 105 may communicate with a cellular communication network by transmitting wireless signals to, and/or receiving wireless signals from, a cellular transceiver, such as an evolved Node B (eNodeB or eNB) 110-1 in the E-UTRAN 112. The E-UTRAN 112 may include one or more additional eNBs 110-2. The eNB 110-1 provides user plane and control plane protocol terminations toward the UE 105. The eNB 110-1 may comprise a serving eNB for UE 105 and may also be referred to as a base station, a base transceiver station, a radio base station, a radio transceiver, a radio network controller, a transceiver function, a base station subsystem (BSS), an extended service set (ESS), or by some other suitable terminology. The UE 105 also may transmit wireless signals to, or receive wireless signals from, a local transceiver such as WiFi access point (AP) 115, which may provide access to a wireless local area network (WLAN, e.g., IEEE 802.11 network) and may be connected in some instances to a WWAN such as EPC 120 (not shown in FIG. 1). The UE 105 also may transmit wireless signals to, or receive wireless signals from other local transceivers (not shown in FIG. 1), such as a femtocell, Home Base Station, small cell base station, Home Node B (HNB) or Home eNodeB (HeNB), which may provide access to a wireless personal area network (WPAN, e.g., Bluetooth network) or a cellular network (e.g. an LTE network or other wireless wide area network). Of course, it should be understood that these are merely examples of networks that may communicate with a mobile device over a wireless link, and claimed subject matter is not limited in this respect.

Examples of network technologies that may support wireless communication include NB-IoT and LTE, but may further include GSM, CDMA, WCDMA, HRPD, eMTC and 5G NR. NB-IoT, GSM, WCDMA, LTE, eMTC and NR are technologies defined by 3GPP. CDMA and HRPD are technologies defined by the 3rd Generation Partnership Project 2 (3GPP2). Cellular transceivers, such as eNBs 110-1 and 110-2, may comprise deployments of equipment providing subscriber access to a wireless telecommunication network for a service (e.g., under a service contract). Here, a cellular transceiver may perform functions of a cellular base station in servicing subscriber devices within a cell determined based, at least in part, on a range at which the cellular transceiver is capable of providing access service.

The eNBs 110-1 and 110-2 may be connected by an interface (e.g. the 3GPP S1 interface) to the EPC 120. The EPC 120 includes a Mobility Management Entity (MME) 122, and a Serving Gateway (SGW) 126 through which data (e.g. Internet Protocol (IP) packets) to and from the UE 105 may be transferred. The MME 122 may be the serving MME for UE 105 and is then the control node that processes the signaling between the UE 105 and the EPC 120 and supports attachment and network connection of UE 105, mobility of UE 105 (e.g. via handover between network cells) as well as establishing and releasing data bearers on behalf of the UE 105. Generally, the MME 122 provides bearer and connection management for the UE 105 and may be connected to the SGW 126, the eNBs 110-1 and 110-2, an Enhanced Serving Mobile Location Center (E-SMLC) 124 and a Gateway Mobile Location Center (GMLC) 132 in the EPC 120.

The E-SMLC 124 may support location of the UE 105 using the 3GPP control plane (CP) location solution defined in 3GPP technical specifications (TSs) 23.271 and 36.305. The GMLC 132 may provide access on behalf of an external client (e.g. external client 150) or another network (e.g. HPLMN) to the location of UE 105. The external client 150 may comprise a web server or remote application that may have some association with UE 105 (e.g. may be accessed by a user of UE 105 via E-UTRAN 112 and EPC 120) or may be a server, application or computer system providing a location service to some other user or users which may include obtaining and providing the location of UE 105 (e.g. to enable a service such as friend or relative finder, asset tracking or child or pet location). The external client 150 may be referred to as a SUPL Agent 150 when accessing an SLP such as SLP 130.

E-SMLC 124 may be connected to or have access to one or more reference stations 135 which may be part of EPC 120 or separate from EPC 120 (e.g. part of a GNSS reference network and owned and operated by a service provider different to the operator of EPC 120). A reference station 135 may comprise or include a GNSS receiver configured to acquire, measure and decode signals transmitted by one or more GNSSs, such as GPS, GLONASS, Galileo or Beidou. A reference station 135 may be configured to obtain or determine orbital and timing data for Satellite Vehicles (SVs) 160 for one or more GNSSs and infer information for environmental factors that can affect GNSS location such as ionospheric and tropospheric delay. A reference station 135 may transfer determined information to E-SMLC 124—e.g. periodically or whenever the determined information changes.

As illustrated, the EPC 120 includes a Packet Data Network Gateway (PDG) 128 that may be connected to the SGW 126 (e.g. via the Internet, directly or through a local intranet). The PDG 128 may provide UE 105 with Internet Protocol (IP) address allocation and IP and other data access to external networks (e.g. the Internet) and to external clients (e.g. external client 150) and external servers, as well as other data transfer related functions. In some cases, PDG 128 may be located in an HPLMN and not in EPC 120 when the UE 105 is roaming and receives local IP breakout. The PDG 128 may be connected to a location server, such as a Secure User Plane Location (SUPL) Location Platform (SLP) 130. The SLP 130 may support the SUPL UP location solution defined by OMA and may support location services for UE 105 based on subscription information for UE 105 stored in SLP 130. In some embodiments of communication system 100, SLP 130 may function as a Home SLP (H-SLP) for UE 105, a Discovered SLP (D-SLP) and/or as an Emergency SLP (E-SLP).

To support a SUPL location session (also referred to as a SUPL session, a SUPL positioning session or a location session) between UE 105 and SLP 130 in communication system 100, the UE 105 and SLP 130 may exchange SUPL messages at a user plane level using IP and TCP (or possibly UDP for an initial SUPL INIT message) as transport protocols. For example, in FIG. 1 a typical path for a SUPL message may comprises routing the SUPL message through eNB 110-1, SGW 126 and PDG 128, in this order for a SUPL message sent from UE 105 to SLP 130 or in the reverse order for a SUPL message sent from SLP 130 to UE 105.

The GMLC 132 may be connected to a Home Subscriber Server (HSS) 134 for UE 105, which is a central database that contains user-related and subscription-related information for UE 105. The GMLC 132 may provide location access to the UE 105 on behalf of external clients such as external client 150. The EPC 120 may further include a Location Retrieval Function (LRF) 136 that may be connected to the GMLC 132 and/or to the SLP 130, as defined in 3GPP Technical Specifications (TSs) 23.271 and 23.167. LRF 136 may perform the same or similar functions to GMLC 132, with respect to receiving and responding to a location request from an external client 150 that corresponds to a Public Safety Answering Point (PSAP) supporting an emergency call from UE 105. One or more of the GMLC 132, PDG 128, LRF 136, and SLP 130 may be connected to the external client 150, e.g., through another network, such as the Internet. In some cases, a Requesting GMLC (RGMLC) located in another PLMN (not shown in FIG. 1) may be connected to GMLC 132 (e.g. via the Internet) and/or to the SLP 130 in order to provide location access to UE 105 on behalf of external clients connected to the RGMLC. The GMLC 132 may support location access to the UE 105 using the 3GPP CP solution defined in 3GPP TS 23.271.

It should be understood that while a single network (comprising E-UTRAN 112 and EPC 120) is illustrated in FIG. 1, a separate HPLMN may be present, which may include a separate GMLC (e.g., an H-GMLC) and may include the SLP 130 (e.g. connected to a PDG in the HPLMN, where the PDG may be connected to the SGW 126 in EPC 120).

In particular implementations, the UE 105 may have circuitry and processing resources capable of obtaining location related measurements (also referred to as location measurements), such as measurements for signals received from GPS or other Satellite Positioning System (SPS) SVs 160, measurements for cellular transceivers such as eNBs 110-1 and 110-2, and/or measurements for local transceivers. UE 105 may further have circuitry and processing resources capable of computing a position fix or estimated location of UE 105 based on these location related measurements. In some implementations, location related measurements obtained by UE 105 may be transferred to a location server, such as the E-SMLC 124, or SLP 130, after which the location server may estimate or determine a location for UE 105 based on the measurements.

Location related measurements obtained by UE 105 may include measurements of signals received from SVs 160 that are part of an SPS or Global Navigation Satellite System (GNSS) such as GPS, GLONASS, Galileo or Beidou and/or may include measurements of signals received from terrestrial transmitters fixed at known locations (e.g., such as eNB 110-1, eNB 110-2 or other local transceivers). UE 105 or a separate location server (e.g. E-SMLC 124 or SLP 130) may then obtain a location estimate for the UE 105 based on these location related measurements using any one of several position methods such as, for example, GNSS, Assisted GNSS (A-GNSS), Advanced Forward Link Trilateration (AFLT), Observed Time Difference Of Arrival (OTDOA), Enhanced Cell ID (ECID), WiFi (also referred to as WLAN positioning), or combinations thereof. In some of these techniques (e.g. A-GNSS, AFLT and OTDOA), pseudoranges, code phases, carrier phases or timing differences may be measured by UE 105 relative to three or more terrestrial transmitters fixed at known locations or relative to four or more SVs with accurately known orbital data, or combinations thereof, based at least in part, on pilot signals, positioning reference signals (PRS) or other positioning related signals transmitted by the transmitters or SVs and received at the UE 105.

Here, location servers, such as E-SMLC 124 or SLP 130, may be capable of providing positioning assistance data to UE 105 including, for example, information regarding signals to be measured by UE 105 (e.g., expected signal timing, signal coding, signal frequencies, signal Doppler), locations and/or identities of terrestrial transmitters, and/or signal, timing and orbital information for GNSS SVs 160 to facilitate positioning techniques such as A-GNSS, AFLT, OTDOA and ECID. The facilitation may include improving signal acquisition and measurement accuracy by UE 105 and/or, in some cases, enabling UE 105 to compute its estimated location based on the location measurements. For example, a location server may comprise an almanac (e.g., a Base Station Almanac (BSA)) which indicates the locations and identities of cellular transceivers and transmitters (e.g. eNBs 110-1 and 110-2) and/or local transceivers and transmitters in a particular region or regions such as a particular venue, and may further contain information descriptive of signals transmitted by these transceivers and transmitters such as signal power, signal timing, signal bandwidth, signal coding and/or signal frequency.

In the case of ECID, a UE 105 may obtain measurements of signal strength (e.g. received signal strength indication (RSSI) or reference signal received power (RSRP)) for signals received from cellular transceivers (e.g., eNBs 110-1, 110-2) and/or local transceivers and/or may obtain a signal to noise ratio (S/N), a reference signal received quality (RSRQ), or a round trip signal propagation time (RTT) between UE 105 and a cellular transceiver (e.g., eNB 110-1 or 110-2) or a local transceiver. A UE 105 may transfer these measurements to a location server, such as E-SMLC 124 or SLP 130, to determine a location for UE 105, or in some implementations, UE 105 may use these measurements together with positioning assistance data (e.g. terrestrial almanac data or GNSS SV data such as GNSS Almanac and/or GNSS Ephemeris information) received from the location server to determine a location for UE 105.

In the case of OTDOA, UE 105 may measure a Reference Signal Time Difference (RSTD) between signals, such as a Position Reference Signal (PRS) or Cell Specific Reference Signal (CRS), received from nearby transceivers or base stations (e.g. eNBs 110-1 and 110-2). An RSTD measurement may provide the time of arrival difference between signals (e.g. CRS or PRS) received at UE 105 from two different transceivers (e.g. an RSTD between signals received from eNB 110-1 and from eNB 110-2). The UE 105 may return the measured RSTDs to a location server (e.g. E-SMLC 124 or SLP 130), which may compute an estimated location for UE 105 based on known locations and known signal timing for the measured transceivers. In some implementations of OTDOA, the signals used for RSTD measurements (e.g. PRS or CRS signals) may be accurately synchronized by the transceivers or transmitters to a common universal time such as GPS time or coordinated universal time (UTC), e.g., using a GPS receiver at each transceiver or transmitter to accurately obtain the common universal time.

An estimate of a location of a UE 105 may be referred to as a location, location estimate, location fix, fix, position, position estimate or position fix, and may be geodetic, thereby providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). Location of the UE 105 determined based on SPS 160 and/or base station 110 signals, however, are not typically expressed as a civic location. The civic location of the WiFi AP 115 may be obtained and used as the civic location of the UE 105, as discussed herein. A location of a UE 105 may also include an uncertainty and may then be expressed as an area or volume (defined either geodetically or in civic form) within which the UE 105 is expected to be located with some given or default probability or confidence level (e.g., 67% or 95%). A location of a UE 105 may further be an absolute location (e.g. defined in terms of a latitude, longitude and possibly altitude and/or uncertainty) or may be a relative location comprising, for example, a distance and direction or relative X, Y (and Z) coordinates defined relative to some origin at a known absolute location or some previous location of UE 105. In the description contained herein, the use of the term location may comprise any of these variants unless indicated otherwise. Measurements (e.g. obtained by UE 105 or by another entity such as eNB 110-1) that are used to determine (e.g. calculate) a location estimate for UE 105 may be referred to as measurements, location measurements, location related measurements, positioning measurements or position measurements and the act of determining a location for the UE 105 may be referred to as positioning of the UE 105 or locating the UE 105.

Figure 2:
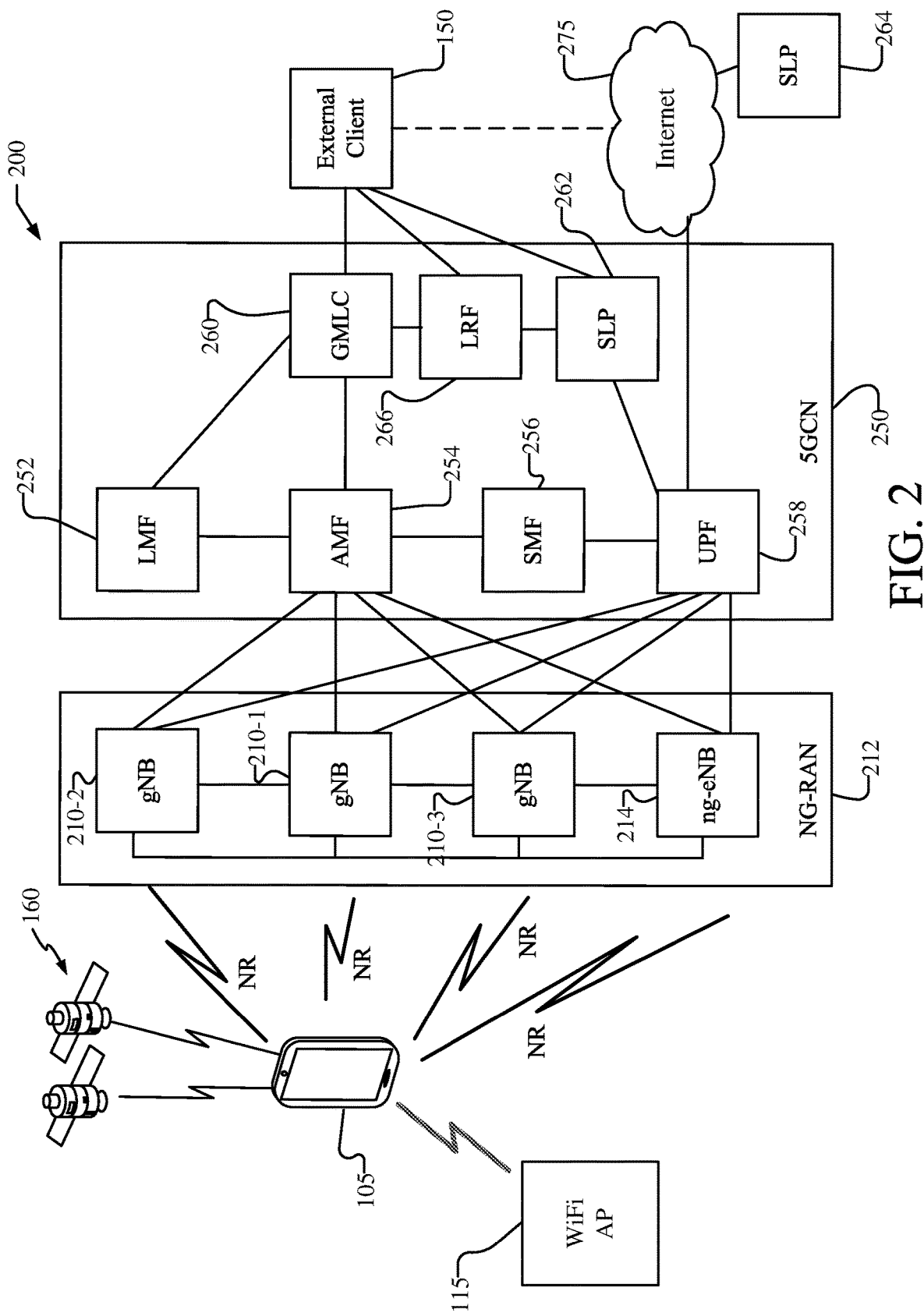
FIG. 2 is a diagram illustrating certain features of a Fifth Generation (5G) communication system comprising a mobile device and a cellular network.

FIG. 2 is a diagram illustrating another communication system 200 that supports civic location for emergency calls for the UE 105 using a Fifth Generation (5G) network comprising a Next Generation Radio Access Network (NG-RAN) 212, which includes base stations (BSs) sometimes referred to as New Radio (NR) NodeBs or gNBs 210-1, 210-2, 210-3, and a next generation eNB (ng-eNB) 214, and a 5G Core Network (5GCN) 250 that is in communication with an external client 150. A 5G network may also be referred to as a New Radio (NR) network; NG-RAN 212 may be referred to as an NR RAN or a 5G RAN; and 5GCN 250 may be referred to as an Next Generation (NG) Core network (NGC). The communication system 200 may further utilize information from the SVs 160 for a Global Navigation Satellite System (GNSS) like GPS, GLONASS, Galileo or Beidou or some other local or regional Satellite Positioning System (SPS) such as IRNSS, EGNOS or WAAS. Additional components of the communication system 200 are described below. The communication system 200 may include additional or alternative components.

FIG. 2 shows a serving gNB 210-1 for the target UE 105 and neighbor gNBs 210-2, 210-3, and ng-eNB 214. A neighbor gNB 210 may be any gNB which is able to receive and measure uplink (UL) signals transmitted by the target UE 105 and/or is able to transmit a downlink (DL) reference signal (RS), e.g., positioning reference signals (PRS), that can be received and measured by the target UE 105. The gNBs 210 may support NR wireless access by the UE 105 to the 5GCN 250, whereas the ng-eNB 214 may support LTE wireless access by the UE 105 to 5GCN 250.

Entities in the NG-RAN 212 which transmit DL PRSs to be measured by a target UE 105 for a particular location session are referred to generically as "Transmission Points" (TPs) and can include one or more of the serving gNB 210-1, and neighbor gNBs 210-2, 210-3, and ng-eNB 214.

Entities in the NG-RAN 212 which receive and measure UL signals (e.g. an RS) transmitted by a target UE 105 for a particular location session are referred to generically as "Reception Points" (RPs) and can include one or more of the serving gNB 210-1, and neighbor gNBs 210-2, 210-3, and ng-eNB 214.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the communication system 200. Similarly, the communication system 200 may include a larger or smaller number of SVs 160, gNBs 210, ng-eNBs 214, WiFi APs 115, external clients 150, and/or other components. The illustrated connections that connect the various components in the communication system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

As illustrated, the UE 105 may communicate with a WiFi AP 115, which may provide access to a wireless local area network (WLAN, e.g., IEEE 802.11 network) and/or may be connected to a WWAN such as 5GCN 250 (not shown in FIG. 2), and may provide a civic location that may be used as the civic location of the UE 105, as discussed herein. For example, with a WLAN, e.g., IEEE 802.11 radio interface, the UE 105 may communicate with an Access Network (AN) (e.g. via the WiFi AP 115). The AN (e.g. IEEE 802.11 AN) may be connected to a Non-3GPP Interworking Function (N3IWF) (e.g. in 5GCN 250) (not shown in FIG. 2), with the N3IWF connected to AMF 254.

The UE 105 may enter a connected state with a wireless communication network that may include the NG-RAN 212. In one example, the UE 105 may communicate with a cellular communication network by transmitting wireless signals to, or receiving wireless signals from a cellular transceiver, in the NG-RAN 212, such as a gNB 210-1. A transceiver provides user and control planes protocol terminations toward the UE 105 and may be referred to as a base station, a base transceiver station, a radio base station, a radio transceiver, a radio network controller, a transceiver function, a base station subsystem (BSS), an extended service set (ESS), or by some other suitable terminology.

In particular implementations, the UE 105 may have circuitry and processing resources capable of obtaining location related measurements. Location related measurements obtained by UE 105 may include measurements of signals received from satellite vehicles (SVs) 160 belonging to a Satellite Positioning System (SPS) or Global Navigation Satellite System (GNSS) such as GPS, GLONASS, Galileo or Beidou and/or may include measurements of signals received from terrestrial transmitters fixed at known locations (e.g., such as gNBs 210). UE 105 or gNB 210-1 to which UE 105 may send the measurements, may then obtain a location estimate for the UE 105 based on these location related measurements using any one of several position methods such as, for example, GNSS, Assisted GNSS (A-GNSS), downlink Time Difference of Arrival (DL-TDOA), WLAN (also referred to as WiFi) positioning, or Enhanced Cell ID (ECID) or combinations thereof. In some of these techniques (e.g. A-GNSS and DL-TDOA), pseudoranges or timing differences may be measured at UE 105 relative to three or more terrestrial transmitters (e.g. gNBs 210) fixed at known locations or relative to four or more SVs 160 with accurately known orbital data, or combinations thereof, based at least in part, on pilots, positioning reference signals (PRS) or other positioning related signals transmitted by the transmitters or satellites and received at the UE 105.

The location server in FIG. 2, which may correspond to, e.g., Location Management Function (LMF) 252 or Secure User Plane Location (SUPL) Location Platform (SLP) 262, may be capable of providing positioning assistance data to UE 105 including, for example, information regarding signals to be measured (e.g., expected signal timing, signal coding, signal frequencies, signal Doppler), locations and identities of terrestrial transmitters (e.g. gNBs 210) and/or signal, timing and orbital information for GNSS SVs 160 to facilitate positioning techniques such as A-GNSS, OTDOA, DL-TDOA and ECID. The facilitation may include improving signal acquisition and measurement accuracy by UE 105 and, in some cases, enabling UE 105 to compute its estimated location based on the location measurements. For example, a location server (e.g. LMF 252 or SLP 262) may comprise an almanac, also referred to as a base station almanac (BSA), which indicates locations and identities of cellular transceivers and/or local transceivers in a particular region or regions such as a particular venue, and may provide information descriptive of signals transmitted by a cellular base station or AP (e.g. a gNB 210 or WiFi AP 115) such as transmission power and signal timing.

A UE 105 may obtain measurements of signal strengths (e.g. received signal strength indication (RSSI)) for signals received from cellular transceivers and/or local transceivers and/or may obtain a signal to noise ratio (S/N), a reference signal received power (RSRP), a reference signal received quality (RSRQ), a time of arrival (TOA), an angle of arrival (AOA), an angle of departure (AOD), a receive time-transmission time difference (Rx-Tx), or a round trip signal propagation time (RTT) between UE 105 and a cellular transceiver (e.g. a gNB) or a local transceiver (e.g. a WiFi access point (AP)). A UE 105 may use these measurements together with assistance data (e.g. terrestrial almanac data or GNSS satellite data such as GNSS Almanac and/or GNSS Ephemeris information) received from a location server (e.g. LMF 252 or SLP 262) or broadcast by a base station (e.g. a gNB 210-1) in NG-RAN 212 to determine a location for UE 105.

In some implementations, network entities are used to assist in location of a target UE 105. For example, entities in a network such as gNBs 210 may measure UL signals transmitted by UE 105. The UL signals may include or comprise UL reference signals such as UL positioning reference signals (PRSs) or UL Sounding Reference Signals (SRSs). The entities obtaining the location measurements (e.g. gNBs 210) may then transfer the location measurements to the UE 105 or to LMF 252 to determine a location of the UE 105. Examples of location measurements that may use UL signals can include an RSSI, RSRP, RSRQ, TOA, Rx-Tx, AOA and RTT.

As shown in FIG. 2, pairs of gNBs in NG-RAN 212 may be connected to one another, e.g., directly as shown in FIG. 2 or indirectly via other gNBs 210. Access to the 5G network is provided to UE 105 via wireless communication between the UE 105 and one or more of the gNBs 210 which may provide wireless communication access to the 5GCN 250 on behalf of the UE 105 using 5G (e.g. NR). In FIG. 2, the serving gNB for UE 105 is assumed to be gNB 210-1, although other gNBs (e.g. gNB 210-2, 210-3, or ng-eNB 214) may act as a serving gNB if UE 105 moves to another location or may act as a secondary gNB to provide additional throughout and bandwidth to UE 105. Some gNBs in FIG. 2 (e.g. gNB 210-2, 210-3, or ng-eNB 214) may be configured to function as positioning-only beacons which may transmit signals (e.g. directional PRS) to assist positioning of UE 105 but may not receive signals from UE 105 or from other UEs.

The gNBs 210-1, 210-2, 210-3, and ng-eNB 214 can communicate with the Access and Mobility Management Function (AMF) 254, which, for positioning functionality, may communicate with a Location Management Function (LMF) 252. The AMF 254 may support mobility of the UE 105, including cell change and handover and may participate in supporting a signaling connection to the UE 105 and possibly helping establish and release Protocol Data Unit (PDU) sessions for UE 105 supported by the UPF 258. Other functions of AMF 254 may include: termination of a control plane (CP) interface from NG-RAN 212; termination of Non-Access Stratum (NAS) signaling connections from UEs such as UE 105, NAS ciphering and integrity protection; registration management; connection management; reachability management; mobility management; access authentication and authorization.

The gNB 210-1 may support positioning of the UE 105 when UE 105 accesses the NG-RAN 212. The gNB 210-1 may also process location service requests for the UE 105, e.g., received directly or indirectly from the GMLC 260. In some embodiments, a node/system that implements the gNB 210-1 may additionally or alternatively implement other types of location-support modules, such as an Enhanced Serving Mobile Location Center (E-SMLC) or a Secure User Plane Location (SUPL) Location Platform (SLP) 262. It will be noted that in some embodiments, at least part of the positioning functionality (including derivation of the location of UE 105) may be performed at the UE 105 (e.g., using signal measurements for signals transmitted by wireless nodes, and assistance data provided to the UE 105).

The GMLC 260 may support a location request for the UE 105 received from an external client 150 and may forward such a location request to a serving AMF 254 for UE 105. The AMF 254 may then forward the location request to either gNB 210-1 or LMF 252 which may obtain one or more location estimates for UE 105 (e.g. according to the request from external client 150) and may return the location estimate(s) to AMF 254, which may return the location estimate(s) to external client 150 via GMLC 260. GMLC 260 may contain subscription information for an external client 150 and may authenticate and authorize a location request for UE 105 from external client 150. GMLC 260 may further initiate a location session for UE 105 by sending a location request for UE 105 to AMF 254 and may include in the location request an identity for UE 105 and the type of location being requested (e.g. such as a current location or a sequence of periodic or triggered locations).

The 5GCN 250 may further include a Location Retrieval Function (LRF) 266 that may be connected to the GMLC 260 and/or to the SLP 262, as defined in 3GPP Technical Specifications (TSs) 23.273 and 23.167. LRF 266 may perform the same or similar functions to GMLC 260, with respect to receiving and responding to a location request from an external client 150 that corresponds to a Public Safety Answering Point (PSAP) supporting an emergency call from UE 105.

As further illustrated in FIG. 2, an external client 150 may be connected to the core network 250 via the GMLC 260, LRF 266, and/or the SLP 262. The external client 150 may optionally be connected to the core network 250 and/or to an SLP 264, that is external to 5GCN 250, via the Internet 275. The external client 150 may be a server, a web server, or a user device, such as a personal computer, a UE, a PSAP, etc.

The LMF 252 and the gNB 210-1 may communicate using a New Radio Position Protocol A (which may be referred to as NRPPa). NRPPa may be defined in 3GPP TS 38.455, with NRPPa messages being transferred between the gNB 210-1 and the LMF 252. Further, the LMF 252 and UE 105 may communicate using the LTE Positioning Protocol (LPP) defined in 3GPP TS 37.355, where LPP messages are transferred between the UE 105 and the LMF 252 via the serving AMF 254 and the serving gNB 210-1 for UE 105. For example, LPP messages may be transferred between the AMF 254 and the UE 105 using a 5G Non-Access Stratum (NAS) protocol. The LPP protocol may be used to support positioning of UE 105 using UE assisted and/or UE based position methods such as Assisted GNSS (A-GNSS), Real Time Kinematic (RTK), Wireless Local Area Network (WLAN, also referred to as WiFi), Observed Time Difference of Arrival (OTDOA), DL-TDOA, Round-Trip Time (RTT), multi-cell RTT, downlink AOD (DL-AOD), and/or Enhanced Cell Identity (ECID). The NRPPa protocol may be used to support positioning of UE 105 using network based position methods such as ECID or uplink time difference of arrival (UL-TDOA), e.g. when used with measurements obtained by or received from a gNB 210-1, 210-2, 210-3, or ng-eNB 214, may be used to support combined UE and network based position methods such as multi-cell RTT, and/or may be used by LMF 252 to obtain location related information from gNBs 210 such as parameters defining positioning reference signal (PRS) transmission from gNBs for support of DL-TDOA, multi-cell RTT and/or DL-AOD.

GNBs 210-1, 210-2, 210-3, or ng-eNB 214 may communicate with AMF 254 using a Next Generation Application Protocol (NGAP), e.g. as defined in 3GPP Technical Specification (TS) 38.413, or using a location specific protocol (referred to here as LSP1) transported by NGAP. NGAP or the LSP1 may enable AMF 254 to request a location of a target UE 105 from a gNB 210-1 for target UE 105 and may enable gNB 210-1 to return a location for UE 105 to the AMF 254.

GNBs 210-1, 210-2, 210-3, or ng-eNB 214 may communicate with one another using an Xn Application Protocol (XnAP), e.g. as defined in 3GPP TS 38.423, or using a location specific protocol (referred to here as LSP2) transported by XnAP, which may be different to LSP1. XnAP or LSP2 may allow one gNB 210 to request another gNB 210 to obtain UL location measurements for a target UE and to return the UL location measurements. XnAP or LSP2 may also enable a gNB 210 to request another gNB 210 to transmit a downlink (DL) RS or PRS to enable a target UE 105 to obtain DL location measurements of the transmitted DL RS or PRS. In some embodiments, LSP2 (when used) may be the same as or an extension to NRPPa.

A gNB (e.g. gNB 210-1) may communicate with a target UE 105 using a Radio Resource Control (RRC) protocol, e.g. as defined in 3GPP TS 38.331, or using a location specific protocol (referred to here as LSP3) transported by RRC, which may be different to LSP1 and LSP2. RRC or LSP3 may allow a gNB (e.g. gNB 210-1) to request location measurements from the target UE 105 of DL RSs or DL PRSs transmitted by the gNB 210-1 and/or by other gNBs 210-2, 210-3, or ng-eNB 214 and to return some or all of the location measurements. RRC or LSP3 may also enable a gNB (e.g. gNB 210-1) to request the target UE 105 to transmit an UL RS or PRS to enable the gNB 210-1 or other gNBs 210-2, 210-3, or ng-eNB 214 to obtain UL location measurements of the transmitted UL RS or PRS. In some embodiments, LSP3 (when used) may be the same as, a subset of or an extension to LPP.

With a UE assisted position method, UE 105 may obtain location measurements (e.g. measurements of RSSI, Rx-Tx, RTT, AOA, RSTD, RSRP and/or RSRQ for gNBs 210-1, 210-2, 210-3, or ng-eNB 214 or WLAN APs 115, or measurements of GNSS pseudorange, code phase and/or carrier phase for SVs 160) and send the measurements to an entity performing a location server function, e.g., LMF 252, or SLP 262, for computation of a location estimate for UE 105. With a UE based position method, UE 105 may obtain location measurements (e.g. which may be the same as or similar to location measurements for a UE assisted position method) and may compute a location of UE 105 (e.g. with the help of assistance data received from a location server such as LMF 252 or SLP 262). With a network based position method, one or more base stations (e.g. gNBs 210) or APs may obtain location measurements (e.g. measurements of RSSI, RTT, AOD, RSRP, RSRQ, Rx-Tx or TOA for signals transmitted by UE 105) and/or may receive measurements obtained by UE 105, and may send the measurements to a location server, e.g., LMF 252, for computation of a location estimate for UE 105.

Information provided by the gNBs 210-2, 210-3, or ng-eNB 214 to the gNB 210-1 using XnAP or LSP2 may include timing and configuration information for PRS transmission and location coordinates of the gNBs 210-2, 210-3, or ng-eNB 214. The gNB 210-1 can then provide some or all of this information to the UE 105 as assistance data in an RRC or LSP3 message. An RRC message sent from gNB 210-1 to UE 105 may include an embedded LSP3 message (e.g. an LPP message) in some implementations.

An RRC or LSP3 message sent from the gNB 210-1 to the UE 105 may instruct the UE 105 to do any of a variety of things, depending on desired functionality. For example, the RRC or LSP3 message could contain an instruction for the UE 105 to obtain measurements for GNSS (or A-GNSS), WLAN, multi-cell RTT, DL-TDOA and/or OTDOA (or some other position method) or to transmit uplink (UL) signals, such as Positioning Reference Signals, Sounding Reference Signals, or both. In the case of OTDOA or DL-TDOA, the RRC or LSP3 message may instruct the UE 105 to obtain one or more measurements (e.g. RSTD measurements) of PRS signals transmitted within particular cells supported by particular gNBs. The UE 105 may use the measurements to determine the position of UE 105, e.g., using OTDOA or DL-TDOA.

A gNB 210 in NG-RAN 212 may also broadcast positioning assistance data to UEs such as UE 105.

As illustrated, a Session Management Function (SMF) 256 connects the AMF 254 and the UPF 258. The SMF 256 may have the capability to control both a local and a central UPF within a PDU session. SMF 256 may manage the establishment, modification and release of PDU sessions for UE 105, perform IP address allocation and management for UE 105, act as a Dynamic Host Configuration Protocol (DHCP) server for UE 105, and select and control a UPF 258 on behalf of UE 105.

The User Plane Function (UPF) 258 may support voice and data bearers for UE 105 and may enable UE 105 voice and data access to other networks such as the Internet 275. UPF 258 functions may include: external PDU session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering. UPF 258 may be connected to SLP 262 to enable support of location of UE 105 using SUPL. SLP 262 may be further connected to or accessible from external client 150.

It should be understood that while FIG. 2 shows a network architecture for a non-roaming UE, with suitable, well-known, changes, a corresponding network architecture may be provided for a roaming UE.

During a positioning session, particularly during an emergency call, it is useful to obtain a civic location of the UE 105. Typically, however, a position estimated determined by the UE 105 or a location server, e.g., E-SLMC 124, SLP 130, LMF 252 or SLP 262 is a geodetic location (latitude, longitude and possibly altitude). A civic location of a WiFi AP may be obtained from the WiFi AP. Accordingly, the UE 105 may obtain the civic location for a nearby WiFi AP 115 during a location session, such as for an Emergency call, and the civic location for the WiFi AP 115 may be used as the civic location of the UE 105. The UE 105, for example, may send the location server positioning measurements, as well as the civic location of a WiFi AP 115 during a positioning session. The location server may treat the civic location of the WiFi AP 115 as the civic location of the UE 105, and may report the civic location to a requesting external client 150 (e.g. PSAP). In some implementations, the location server may validate the civic location, e.g., by verifying that a determined geodetic location for the UE 105 is consistent with the civic location of the WiFi AP 115. The location server may further verify that the UE 105 is proximate to the WiFi AP 115 (e.g. within 50 meters of the WiFi AP 115).

Figure 3:
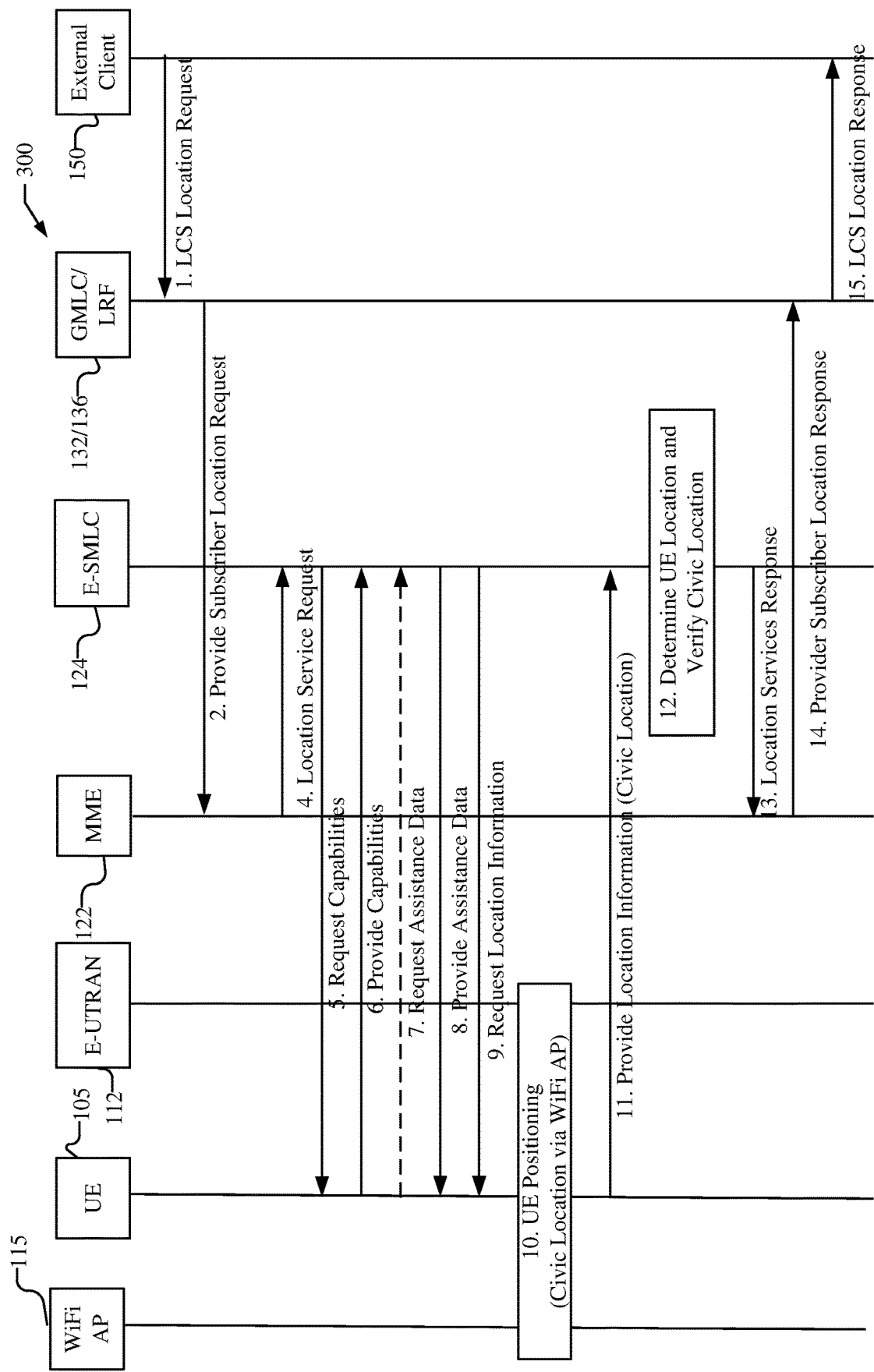
FIGS. 3 and 4 show message flows illustrating a process of determining a civic location for a user equipment (UE).

FIG. 3 is a message flow 300 illustrating an emergency call (EM) Mobile Terminated Location Request (MT-LR) that supports civic location for emergency calls for the UE 105. The message flow 300 may be applicable to the UE 105 in a 4G communication system, such as communication system 100, which includes an E-UTRAN 112, which includes one or more eNBs 110 (shown in FIG. 1), an MME 122, an E-SMLC 124, a GMLC 132 and LRF 136 (illustrated as combined), and an external client 150, which is a PSAP, as well as a WiFi AP 115 in communication with the UE 105. While the GMLC 132 and LRF 136 are illustrated as combined, it should be understood that these entities may be separate, but that the LRF 136 is not always used, e.g., the LRF 136 is used during an emergency E911 call, but is not used for non-E911 locations. Moreover, where SUPL is used, SLP 130 may be used as the location server instead of E-SMLC 124 and SGW 126 and PDG 128 may be used instead of MME 122, and SLP 130 may be used instead of GMLC 132. Moreover, it should be understood that the messages in message flow 300 are provided to illustrate a process of obtaining a civic location for a UE during an emergency call, and that additional messages and actions may be included in a positioning session. In the message flow 300, it is assumed that the UE 105 and location server (E-SMLC 124) communicate using the LPP positioning protocol referred to earlier. The message flow 300 may be performed in control plane (e.g. with E-SMLC 124) or user plane (e.g. with SLP 130).

At stage 1 in FIG. 3, the external client 150 (PSAP) sends a Location Services (LCS) location request to a GMLC/LRF 132/136 to request the location of a UE 105 that has established an emergency services (EM) call to the PSAP 150. For an emergency E911 call, the Location Request goes first to the LRF 136, which forwards the Location Request to the GMLC 132. Moreover, where SUPL is used, the Location Request may be sent by LRF 136 to the SLP 130 (shown in FIG. 1) instead of to GMLC 132. For non-E911 related location requests, the LRF 136 is not used and the Location Request goes directly from the external client 150 to the GMLC 132 (or SLP 130 for SUPL). The GMLC 132 may query the HSS 134 (shown in FIG. 1) for the address of the serving MME 122 for the UE 105.

At stage 2, the GMLC 132 sends a Provide Subscriber Location Request message to the MME 122 to request the location of UE 105.

At stage 4, the MME 122 selects an E-SMLC 124 and sends a Location Service Request message to the E-SMLC 124 to request the location of UE 105.

At stage 5, the E-SMLC 124 sends a Request Capabilities message to the UE 105, to request the positioning capabilities of the UE 105.

At stage 6, the UE 105 returns a Provide Capabilities message to the UE 105, which may provide the positioning capabilities of the UE 105. For example, the UE 105 may indicate that the UE 105 is capable of obtaining a civic location from a WiFi AP.

At optional stage 7, the UE 105 may send a Request Assistance Data message to the E-SMLC 124, e.g., requesting assistance data for positioning.

At stage 8, the E-SMLC 124 may send a Provide Assistance Data message to the UE 105 providing assistance data for positioning, which may include assistance data for obtaining SPS measurements and/or obtaining base station related measurements.

At stage 9, the E-SMLC 124 may send a Request Location Information message to the UE 105. The Request Location Information message may specify desired positioning measurements as well as positioning techniques. The Request Location Information may further specify whether a civic location from one or more WiFi APs is to be obtained.

At stage 10, UE positioning is performed in which positioning measurements, and optionally a geodetic position estimate, are obtained by the UE 105 using SPS and/or base stations in the E-UTRAN 112. Additionally, the UE 105 obtains a civic location for the WiFi AP 115 from WiFi AP 115 (e.g. which may be broadcast by WiFi AP 115 or may be requested by UE 105 and returned by WiFi AP 115 to UE 105). The UE 105 may additionally obtain measurements from the WiFi AP 115, such as one or more of RSSI, RTT, AOA, or a combination thereof.

At stage 11, the UE 105 sends a Provide Location Information message to the E-SMLC 124 that includes the civic location that was obtained from the WiFi AP 115. The Location Information may further include the positioning measurements and/or geodetic position estimate obtained by the UE 105 in stage 10, including the positioning measurements from the SPS and/or base stations in the E-UTRAN 112 and/or from the WiFi AP 115. In some implementations, the UE 105 may provide an indication to the E-SMLC 124 that the civic location was obtained from a WiFi AP.

At stage 12, the E-SMLC 124 determines the UE location based on the positioning measurements and/or position estimate provided by the UE 105. This UE location is geodetic (e.g. includes a latitude and longitude). Additionally, the E-SMLC 124 validates that the civic location of the WiFi AP 115 provided by the UE 105 may be used as the civic location for the UE 105. For example, the E-SMLC 124 may validate the civic location by verifying that the determined UE location is consistent with the civic location of the WiFi AP 115. Moreover, the E-SMLC 124 may additionally or alternatively determine a relative position, e.g., range and/or orientation, between the UE 105 and the WiFi AP 115 to verify a proximity of the UE 105 to the WiFi AP 115, such as whether the UE 105 is in the same building as the WiFi AP 115 and/or how far the UE 105 is from the WiFi AP 115.

At stage 13, the E-SMLC 124 returns a Location Services Response message, which includes the civic location for the UE 105 if validated in stage 12, to the MME 122. The E-SMLC 124 may additionally provide the estimated position of the UE 105, e.g., geodetic location, in some implementations. Additionally, the E-SMLC 124 may indicate that the civic location for the UE 105 was received from a WiFi AP.

At stage 14, the MME 122 returns a Provide Location Response to the GMLC 132, which may include the civic location, and optionally, the determined location estimate for the UE 105. The MME 122 may provide an indication that the civic location for the UE 105 was obtained from a WiFi AP.

At stage 15, the GMLC/LRF 132/136 returns a Location Response to the external client (PSAP) 150, which may include the civic location, and optionally, the determined location estimate for the UE 105. The GMLC/LRF 132/136 may provide an indication that the civic location for the UE 105 was received from a WiFi AP. As described in stage 1, for an emergency E911 location, the messaging to the external client 150 (PSAP) is sent by the LRF 136, while for a non-emergency E911 location the GMLC 132 will forward the location response to the external client 150. Moreover, where SUPL is used, the SLP 130 (shown in FIG. 2) is used instead of GMLC 132.

Figure 4:
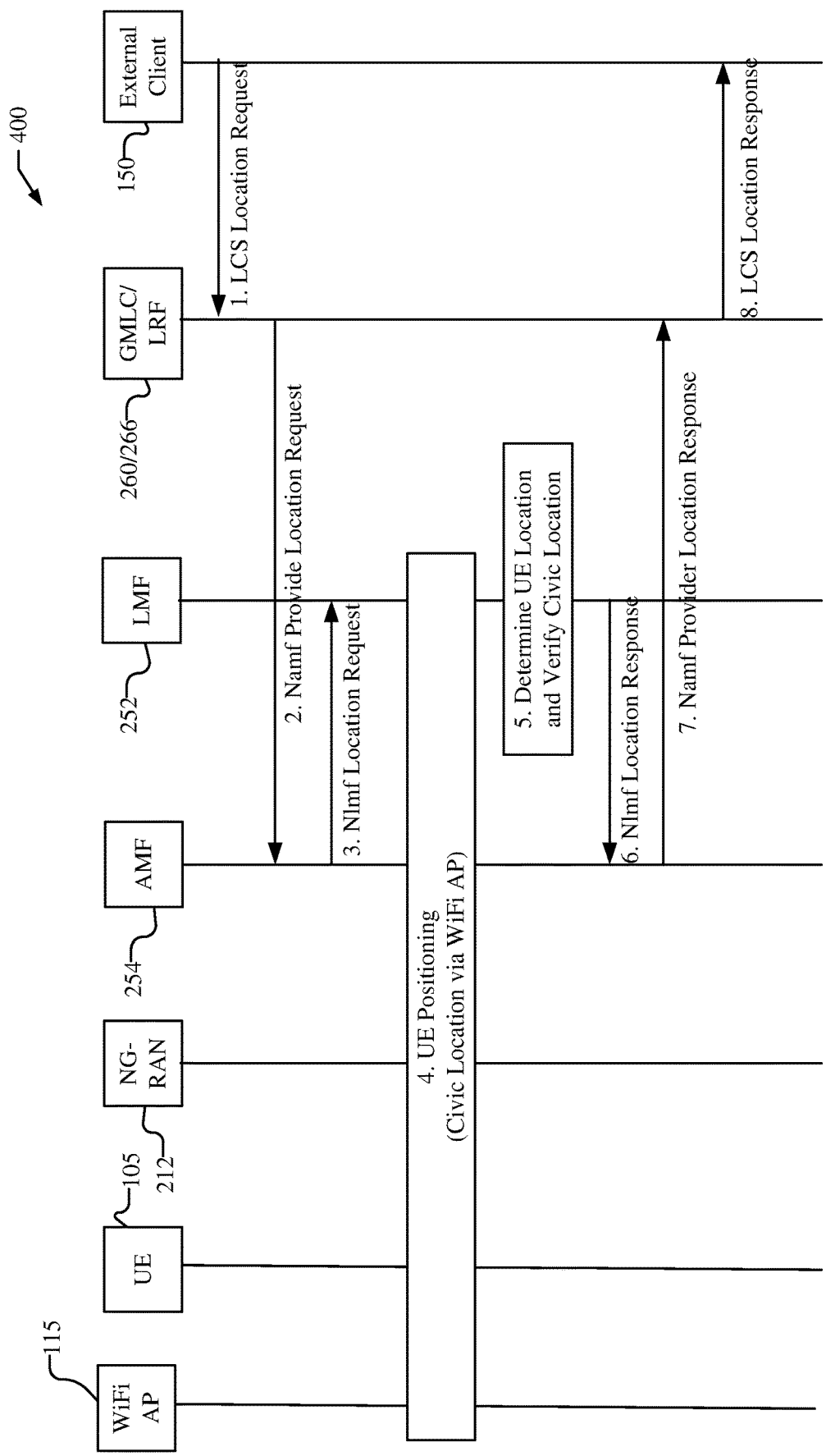

FIG. 4 is a message flow 400 illustrating an emergency services (EM) Mobile Terminated Location Request (MT-LR) that supports civic location for emergency calls for the UE 105. The message flow 400 may be applicable to the UE 105 in a 5G communication system, such as communication system 200, which includes an NG-RAN 212, which includes one or more gNBs 210 and optionally an ng-eNB 214 (shown in FIG. 2), an AMF 254, an LMF 252, a GMLC 260 and LRF 266 (illustrated as combined), and an external client 150, which is a PSAP, as well as a WiFi AP 115 in communication with the UE 105. While the GMLC 260 and LRF 266 are illustrated as combined, it should be understood that these entities may be separate, but that the LRF 266 is not always used, e.g., the LRF 266 is used during an emergency E911 call, but is not used for non-E911 locations. Moreover, where SUPL is used, SLP 262 instead of GMLC 260 may be used. Moreover, it should be understood that the messages in message flow 400 are provided to illustrate a process of obtaining a civic location for a UE during an emergency call, and that additional messages and actions may be included in a positioning session. In the message flow 400, it is assumed that the UE 105 and location server (LMF 252) communicate using the LPP positioning protocol referred to earlier. The message flow 400 may be performed in control plane (with LMF 252) or user plane (with SLP 262).

At stage 1 in FIG. 4, the external client 150 (PSAP) sends a Location Services (LCS) location request to a GMLC/LRF 260/266 to request the location of a UE 105 that has established an EM call to the PSAP (e.g. via an IP Multimedia Subsystem (IMS)). For an emergency E911 call, the Location Request goes first to the LRF 266, which forwards the Location Request to the GMLC 260. Moreover, where SUPL is used, the Location Request may be sent by LRF 266 to the SLP 262 (shown in FIG. 2) instead of to GMLC 260. For non-E911 related location requests, the LRF 266 is not used and the Location Request goes directly from external client 150 to the GMLC 260 (or SLP 262 for SUPL).

At stage 2, the GMLC 260 sends a Provide Location Request message (e.g. using an Namf service operation) to the AMF 254 to request the location of UE 105. GMLC 260 may have been previously notified of the identity of the serving AMF 254 for the UE 105, e.g., due to the occurrence of a Network Induced Location Request (NI-LR) procedure.

At stage 3, the AMF 254 selects an LMF 252 and sends a Location Request (e.g. using an Nlmf service operation) to the LMF 252 to request the location of UE 105.

At stage 4, UE positioning is performed (e.g. using LPP and/or NRPPa signaling as described previously for FIG. 2). Stage 4, for example, may be similar to or the same as stages 5-11 of FIG. 3 described above. During UE positioning in stage 4, the UE 105 receives a request for location information from the LMF 252 and in response obtains positioning measurements, and optionally a position estimate, using SPS 160 and/or base stations in the NG-RAN 212. Additionally, the UE 105 obtains a civic location from the WiFi AP 115. The UE 105 may additionally obtain measurements from the WiFi AP 115, such as one or more of RSSI, RTT, AOA, or a combination thereof. The UE 105 sends a Provide Location Information message to the LMF 252 that includes the civic location that was obtained from the WiFi AP 115 along with positioning measurements, including the positioning measurements from the SPS and/or base stations in the NG-RAN 212 and/or from the WiFi AP 115. In some implementations, the UE 105 may provide a geodetic position estimate to the LMF 252 (if determined). In some implementations, the UE 105 may provide an indication to the LMF 252 that the civic location was obtained from a WiFi AP.

At stage 5, the LMF 252 determines the UE location based on the positioning measurements and/or position estimate provided by the UE 105. This UE location is geodetic (e.g. includes a latitude and longitude). Additionally, the LMF 252 validates that the civic location of the WiFi AP 115 provided by the UE 105 may be used as the civic location for the UE 105. For example, the LMF 252 may validate the civic location by verifying that the determined UE location is consistent with the civic location of the WiFi AP 115. Moreover, the LMF 252 may additionally or alternatively determine a relative position, e.g., range and/or orientation, between the UE 105 and the WiFi AP 115 to verify the proximity of the UE 105 to the WiFi AP 115, such as whether the UE 105 is in the same building as the WiFi AP 115 and/or how far the UE is away from the WiFi AP 115.

At stage 6, the LMF 252 returns a Location Response, which includes the civic location for the UE 105 if validated in stage 5, to the AMF 254. The LMF 252 may additionally provide the estimated position of the UE 105, e.g., geodetic location, in some implementations. Additionally, the LMF 252 may indicate that the civic location for the UE 105 was obtained from a WiFi AP.

At stage 7, the AMF 254 returns a Provide Location Response to the GMLC 260, which may include the civic location, and optionally, the determined location estimate for the UE 105. The AMF 254 may provide an indication that the civic location for the UE 105 was obtained from a WiFi AP.

At stage 8, the GMLC/LRF 260/266 returns a Location Response to the external client (PSAP) 150, which may include the civic location, and optionally, the determined location estimate for the UE 105. The GMLC/LRF 260/266 may provide an indication that the civic location for the UE 105 was obtained from a WiFi AP. As described in stage 1, for an emergency E911 location, the messaging to the external client 150 (PSAP) is sent by the LRF 266, while for a non-emergency E911 location the GMLC 260 will forward the location response to the external client 150. Moreover, where SUPL is used, the SLP 262 (shown in FIG. 2) is used instead of GMLC 260.

As described above, during UE positioning, e.g., stage 10 in FIG. 3 and stage 4 in FIG. 4, the UE 105 may obtain a civic location from the WiFi AP 115. The civic location may be obtained by UE 105, for example, by requesting a Location Civic Report (LCR) from the WiFi AP 115. The LCR may be requested, for example, when the UE 105 initiates RTT/Ranging (e.g., as defined in IEEE 802.11 REVmc) with the WiFi AP 115, and the WiFi AP 115 provides the LCR information as part of a Fine Time Measurement (FTM) frame that is used to calculate an RTT.

Figure 5:
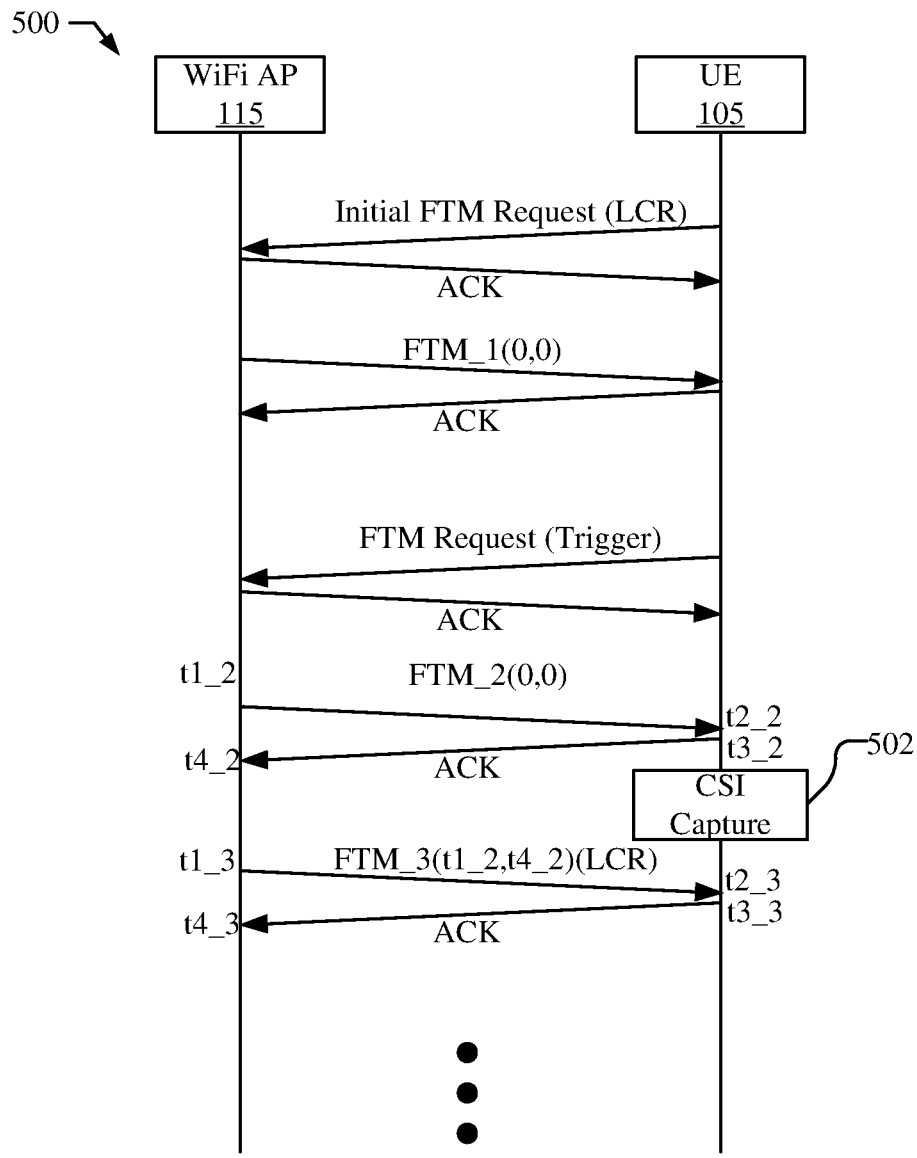
FIG. 5 shows a signal diagram of an example Round Trip Time (RTT) ranging operation in which civic location is reported.

FIG. 5 shows a signal diagram of an example RTT ranging operation 500 between UE 105 and the WiFi AP 115 performed using Fine Timing Measurement (FTM) frames in accordance with the IEEE 802.11 REVmc standards, during which civic location of the WiFi AP 115 is reported. In FIG. 5, UE 105 requests the ranging operation and is, thus, the initiator device (or alternatively the requestor device) and WiFi AP 115 is the responder device. Note that the term "initiator device" may also refer to an initiator station (STA), and the term "responder device" may also refer to a responder STA. In some implementations, the UE 105 may be camped on the WiFi AP 115 prior to performing the RTT ranging operation 500. In some implementations, the UE 105 may not be camped on a WiFi AP, and may perform a scan for WiFi APs, wherein the RTT ranging operation 500 may be performed on one or more WiFi APs that are visible during the scan.

The UE 105 may request or initiate the ranging operation by transmitting an FTM request (Initial FTM Request) frame to WiFi AP 115. The Initial FTM Request frame may request LCR (Location Civic Report) from the WiFi AP 115. The Initial FTM Request frame may also include a request for WiFi AP 115 to capture timestamps (e.g., TOA information) of frames received by WiFi AP 115 from UE 105 and to capture (e.g. obtain and record) timestamps (e.g., TOD information) of frames transmitted from WiFi AP 115. The WiFi AP 115 receives the Initial FTM Request frame, and may acknowledge the requested ranging operation by transmitting an acknowledgement (ACK) frame to UE 105. The ACK frame may indicate whether WiFi AP 115 is capable of providing the requested LCR and capturing the requested timestamps. It is noted that the exchange of the Initial FTM Request frame and the ACK frame is a handshake process that not only signals an intent to perform a ranging operation but also allows UE 105 and WiFi AP 115 to determine whether each supports capturing timestamps and LCR. The WiFi AP 115 may transmit a first FTM frame (FTM_1) to the UE 105. The UE 105 may acknowledge the first FTM frame with an ACK frame to the WiFi AP 115.

The UE 105 may transmit another FTM Request to trigger FTM transmissions from the WiFi AP 115, which the WiFi AP 115 may acknowledge with an ACK message. At time t1_2, WiFi AP 115 transmits a second FTM (FTM_2) frame to UE 105, and may capture a time of departure (TOD) of the FTM_2 frame as time t1_2. The UE 105 receives the FTM_2 frame at time t2_2, and may capture a time of arrival (TOA) of the FTM_2 frame as time t2_2. The UE 105 responds by transmitting an ACK frame to WiFi AP 115 at time t3_2, and may capture a TOD of the ACK frame as time t3_2. The WiFi AP 115 receives the ACK frame at time t4_3, and may capture a TOA of the ACK frame at time t4_2. At time t1_3, WiFi AP 115 transmits to UE 105 a third FTM (FTM_3) frame that includes the LCR information as well as the timestamps captured at times t1_2 and t4_2 (e.g., the TOD of the FTM_2 frame and the TOA of the ACK frame). The WiFi AP 115 may also capture the TOA of the FTM_3 frame at t1_3. The UE 105 receives the FTM_3 frame at time t2_3, and may capture its TOA as time t2_3. The UE 105 transmits an ACK frame to WiFi AP 115 at time t3_3, and may capture its TOD as time t3_3. The WiFi AP 115 receives the ACK frame at time t4_3, and may capture its TOA as time t4_3.

Upon receiving the FTM_3 frame at time t2_3, UE 105 has the LCR information from the WiFi AP 115, as well as the timestamp values for times t1_2, t2_2, t3_2, and t4_2 that correspond to the TOD of the FTM_2 frame transmitted from WiFi AP 115, the TOA of the FTM_2 frame at UE 105, the TOD of the ACK frame transmitted from UE 105, and the TOA of the ACK frame at WiFi AP 115, respectively. Thereafter, the UE 105 may determine an RTT between UE 105 and WiFi AP 115 as (t4_2-t1_2)-(t3_2-t2_2).

Note that the example ranging operation 500 may continue. For example, the process may continue for any number of subsequent FTM and ACK frame exchanges between UE 105 and WiFi AP 115, for example, where WiFi AP 115 embeds the timestamps of a given FTM and ACK frame exchange into a subsequent FTM frame transmitted to UE 105 as for the FTM_3 frame.

The RTT measurement provides a range between the UE 105 and the WiFi AP 115. If the UE 105 measures the range to three or more APs with known locations, UE 105 may use multilateration to estimate the UE 105 position that best fits those measurements.

Figure 6A:
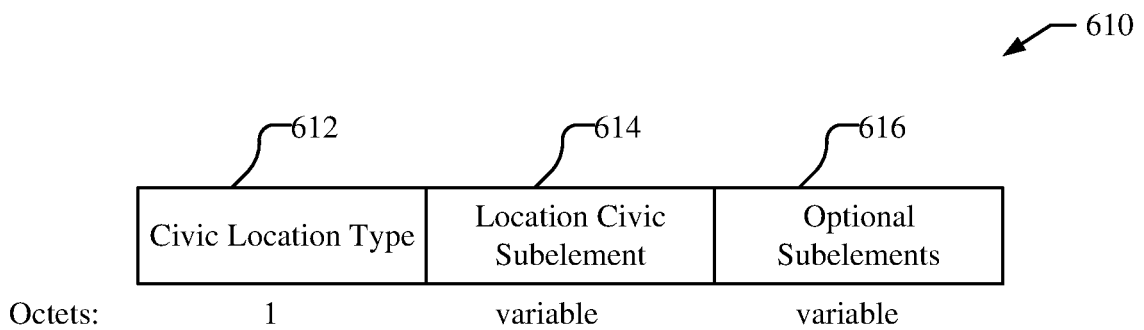
FIGS. 6A and 6B illustrate a Location Civic Report (LCR) formats.
Figure 6B:
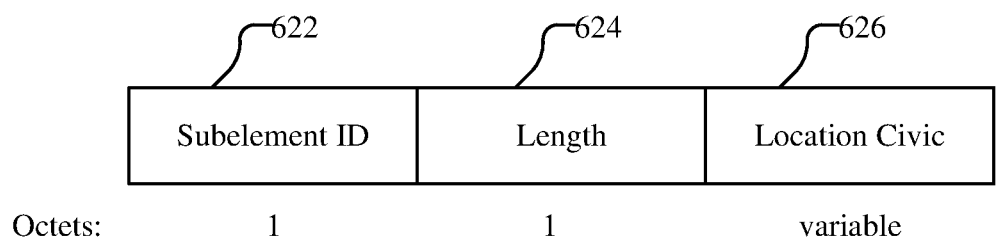

The LCR information received in FTM_3 frame includes a civic location for the WiFi AP 115. FIG. 6A, for example, illustrates a Location Civic Report (LCR) format 610, which includes a Civic Location Type field 612, a Location Civic subelement field 614, and an Optional subelements 616. The Location Civic subelement field 614 contains a Location Civic subelement. FIG. 6B illustrates a format 620 of the Location Civic subelement field 614. The Location Civic subelement format 620 includes a subelement ID field 622, a length field 624, and a Location Civic field 626. The Location Civic field 626 contains a civic location for the WiFi AP 115, which may be include, e.g., a country, and civic address components, such as 1) national subdivisions (state, canton, region, province, prefecture); 2) county, parish, gun, district; 3) city, township, shi; 4) city division, borough, city district, ward, chou; 5) neighborhood, block; 6) group of streets below the neighborhood level. Additional civic address components may include, e.g., house numbers, landmark or vanity address, building (structure), unit, floor, room, etc.

The UE 105 may perform additional WiFi AP 115 measurements as well. For example, the UE 105 may measure RSSI of signals transmitted by the WiFi AP 115, which may be useful in determining a range to the WiFi AP 115. The UE 105 may further measure an angle of arrival (AOA) of signals transmitted from the WiFi AP 115.

Figure 7:
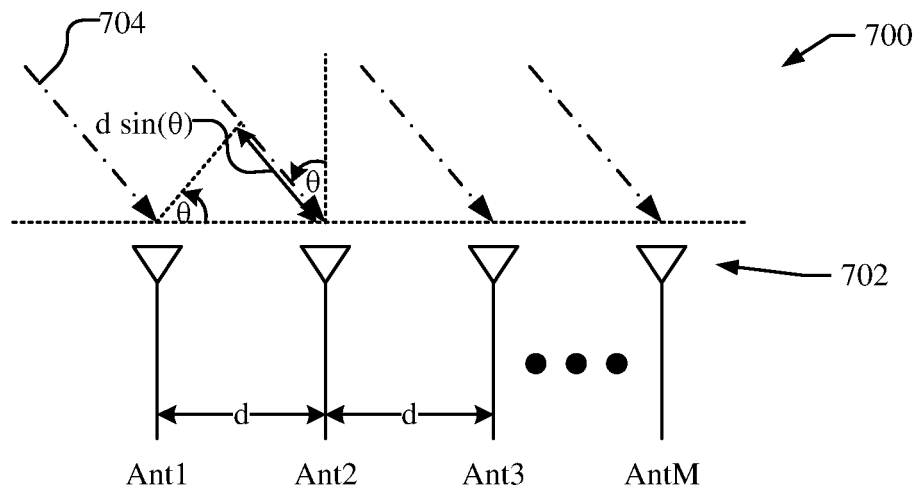
FIG. 7 shows a diagram illustrating the principle of Angle of Arrival determination for a number of antennas.

FIG. 7, for example, shows a diagram 700 illustrating a principle of AOA determination for a number of antennas 702. The AOA is θ and the distance between pairs of adjacent antennas is d. An incoming signal 704 from a WiFi AP 115 must travel farther to reach each subsequent antenna, and consequently, a phase shift Δϕ is introduced. The phase shift Δϕ between two adjacent antennas may be determined as:

$$\Delta\phi = -2\pi \frac{d\,\sin(\theta)}{\lambda} \qquad \text{eq. 1}$$

In equation 1, λ is the wavelength of the signal. Accordingly, the AOA θ may be simply determined as:

$$\theta = \arcsin\left(\frac{\Delta\phi\Box\lambda}{-2\pi d}\right) \qquad \text{eq. 2}$$

The UE 105 may thereby measure the phase shift Δϕ between adjacent pairs of antennas to obtain the AOA θ using eq. 2. Eq. 2 applies in two dimensions which may be sufficient when the UE 105, WiFi AP 115 and the antennas are in the same plane (e.g. a horizontal plane). In three dimensions, the UE 105 can employ another set of antennas spaced apart in a second plane perpendicular to the antennas shown in FIG. 7 and may employ equations similar to eq. 2 that also include an AOA in the second plane.

To measure the phase shift Δϕ of the incoming signal shown in FIG. 7, a Channel Frequency Response (CFR) may be used or Channel State Information (SCI). Channel State Information (CSI), for example, refers to known channel properties of a communication link, and describes how a signal propagates from a transmitter to a receiver, representing combined effects of, for example, scattering, fading, and power decay with distance. Channel Frequency Response (CFR) is a CSI which provides amplitude and phase information on contiguous sub-carriers of a specific channel. The CSI, for example, may be used to express the measured attenuation and phase shift of the signal experienced when travelling from the WiFi AP 115 to the UE 105. The CSI 502, for example, may be captured and the AOA measured while performing the RTT ranging operation 500 shown in FIG. 5, e.g., between FTM_2 and FTM_3.

The WiFi positioning measurements, such as RSSI, AOA, and RTT may be used by the location server (e.g., E-SLMC 124, SLP 130, LMF 252 or SLP 262) for validating the civic location provided in the LCR information, e.g., at stage 11 of FIG. 3 and stage 4 of FIG. 4. The location server may validate the civic location using one or more tests. For example, the location server may validate the civic location by obtaining the UE 105 geodetic location, e.g. based on SPS and/or base station measurements, and verifying that the geodetic location is consistent with the civic location. The verification may be based on the civic location or based on the geodetic location.

Figure 8A:
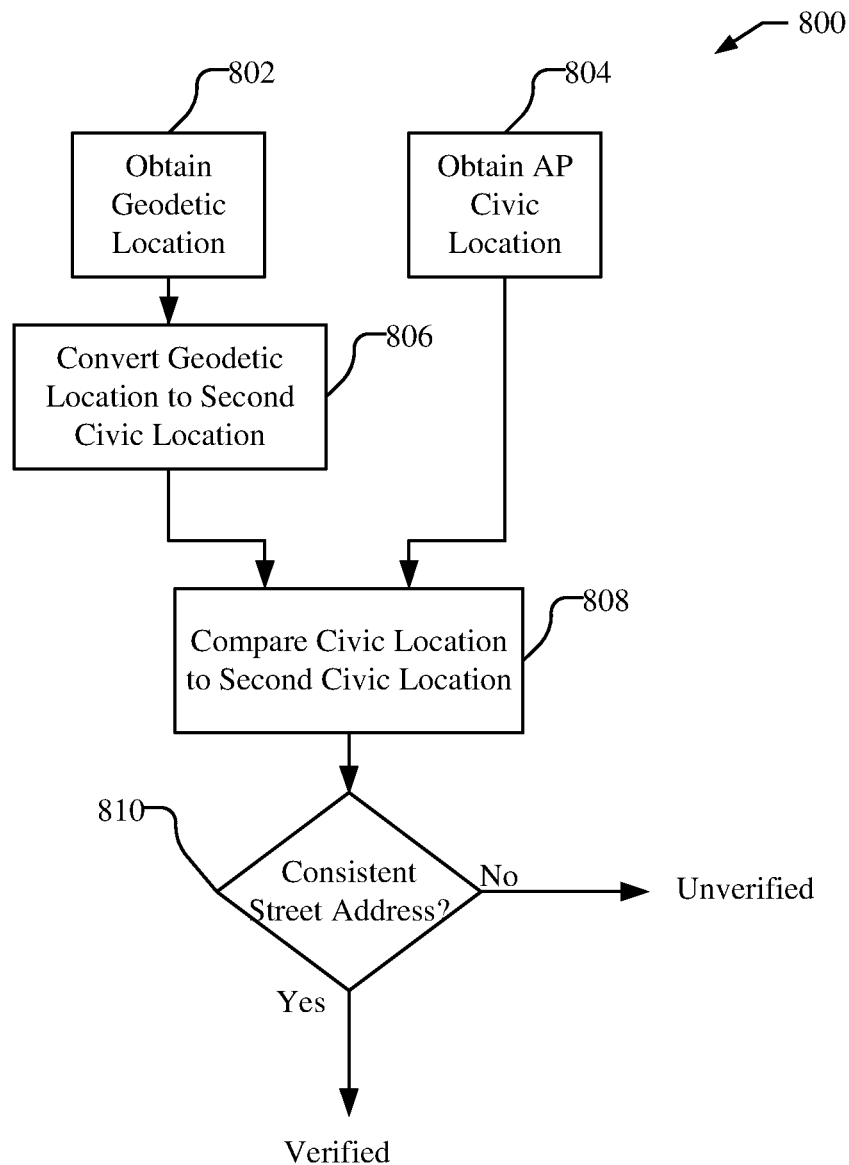
FIGS. 8A and 8B show flow charts illustrating implementations of verification of a civic location based on a geodetic location of a UE.

FIG. 8A is a flow chart 800 illustrating one implementation of verification of a civic location that may be performed by the location server, e.g., E-SLMC 124, SLP 130, LMF 252 or SLP 262. The verification process shown in flow chart 800 is based on civic location, e.g., a comparison of civic locations is performed.

As illustrated, at block 802, the location server obtains the geodetic location of the UE 105. The geodetic location may be obtained by determining the location of the UE 105 based on SPS and/or base station based positioning measurements from the UE 105 that are provided to the location server, e.g., at stage 11 of FIG. 3 or stage 4 of FIG. 4, in a UE-assisted positioning method. The geodetic location may additionally or alternatively be determined by the UE 105, e.g., in a UE based positioning method, and provided to the location server, e.g., at stage 11 of FIG. 3 or stage 4 of FIG. 4.

At block 804, the location server also obtains the AP civic location from the UE 105, which the UE 105 received from the WiFi AP 115.

At block 806, the geodetic location is converted to a second civic location by the location server. For example, geodetic location may be converted to the second civic location using reverse geocoding which may be based on known map data (e.g. data regarding street addresses and building locations and layout).

At block 808, the location server compares the AP civic location to the second civic location. For example, the location server may compare one or more civic address components to determine if they are the same.

At block 810, the location server determines if the street address from the AP civic location and the second civic location are consistent, e.g., match. If the streets or street addresses are consistent (e.g. indicate the same city and street and either the same street number or street numbers that refer to buildings (e.g. houses, shops or offices) or portions of a same building (e.g. apartments or offices) that are either next to or nearby (e.g. within 50 meters) to one another (referred to herein as being adjacent)), then the AP civic location may be considered verified. However, if the streets or street addresses are not consistent (e.g. indicate different cities, different streets or the same street but with street numbers that are not next to or nearby to one another), the AP civic location may be considered unverified. The location server may use a street address comparison, as opposed to house or building address comparison, to verify the civic location because there may be inaccuracies in the geodetic location conversion (at block 806) at the house or building address level, and high levels, e.g., neighborhood or city level, is not precise enough to be relied upon for verification of the civic address.

Figure 8B:
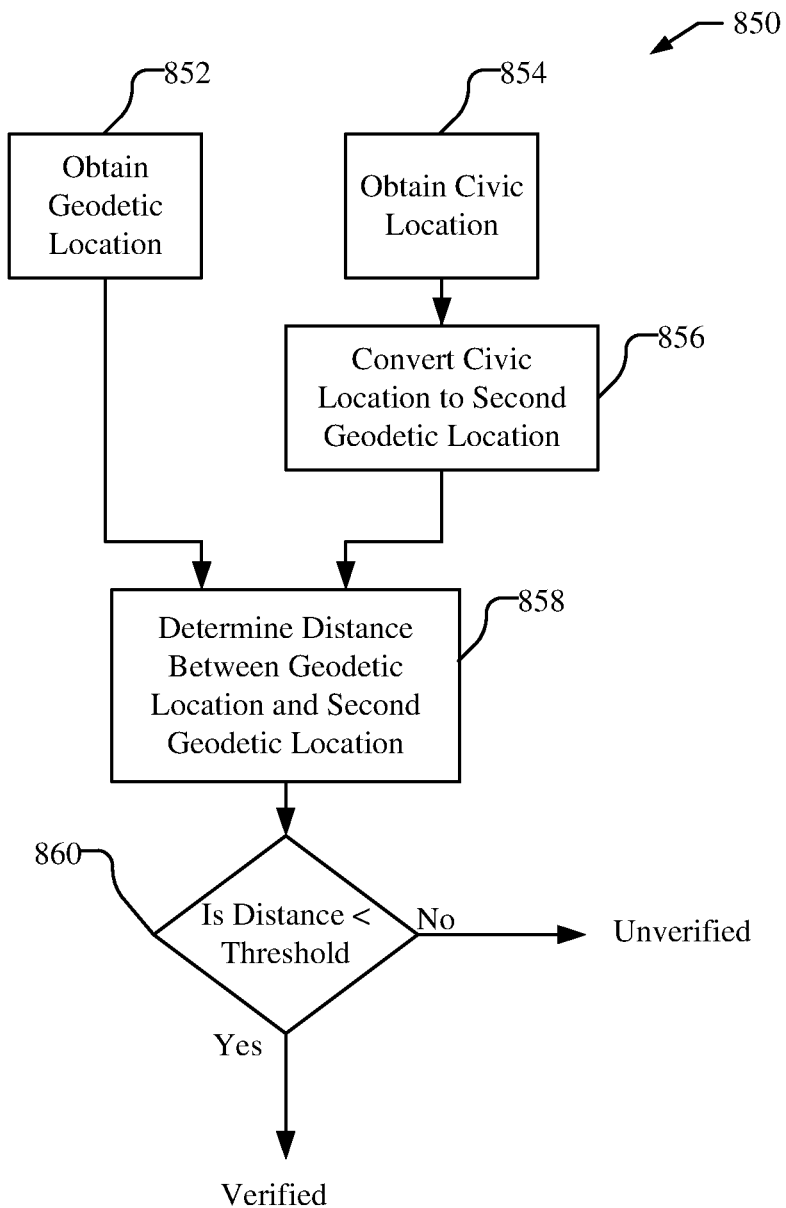

FIG. 8B is a flow chart 850 illustrating another implementation of verification of the civic location that may be performed by the location server, e.g., E-SLMC 124, SLP 130, LMF 252 or SLP 262. The verification process shown in flow chart 850 is based on geodetic location, e.g., a comparison of geodetic locations is performed.

As illustrated, at block 852, the location server obtains the geodetic location of the UE 105. Similar to block 802 described in FIG. 8A, the geodetic location may be obtained by determining the location of the UE 105 based on SPS and/or base station based positioning measurements from the UE 105 that are provided to the location server, e.g., at stage 11 of FIG. 3 or stage 4 of FIG. 4, in a UE-assisted positioning method. The geodetic location may additionally or alternatively be determined by the UE 105, e.g., in a UE based positioning method, and provided to the location server, e.g., at stage 11 of FIG. 3 or stage 4 of FIG. 4.

At block 854, the location server also obtains the AP civic location from the UE 105, which the UE 105 received from the WiFi AP 115.

At block 856, the AP civic location is converted to a second geodetic location by the location server (e.g. using map data which include a geodetic location for every distinct street address).

At block 858, the location server determines a distance between the geodetic location to the second geodetic location. For example, the location server may determine the distance between the latitude and longitude (or X and Y component) of the geodetic location to the latitude and longitude (or X and Y component) of the second geodetic location.

At block 860, the location server determines if distance between the geodetic location to the second geodetic location is less than a predetermined threshold. For example, the predetermined threshold may be 50 or 100 meters. Other predetermined thresholds may be used if desired. Moreover, the threshold may be variable based on the type of area. For example, an urban area may have greater building density than a rural area and, thus, an urban area may use a smaller threshold than a rural area for verification. If the distance is less than a threshold, the AP civic location may be considered verified, whereas if the distance is greater than the threshold, the AP civic location may be considered unverified.

The location server may additionally or alternatively verify a UE 105 proximity to the WiFi AP 115, e.g., using the WiFi AP measurements. Verifying the UE 105 proximity to the WiFi AP 115 can be useful to ensure that the AP civic location can be accurately used as the civic location for the UE 105. For example, if the UE 105 is not near the WiFi AP 115, it is possible that the UE 105 and the WiFi AP 115 are at different civic locations, e.g., in different buildings. Further, even if the UE 105 and the WiFi AP 115 are near each other, it may still be possible that they are in different buildings. By determining a relative orientation of the UE 105 and WiFi AP 115 (e.g. an AOA at UE 105 of signals received from WiFi AP 115 as described for FIG. 7), which may be compared to a map or a building plan, the location server may be able to determine if the UE 105 and WiFi AP 115 are or are not in the same building.

Figure 9:
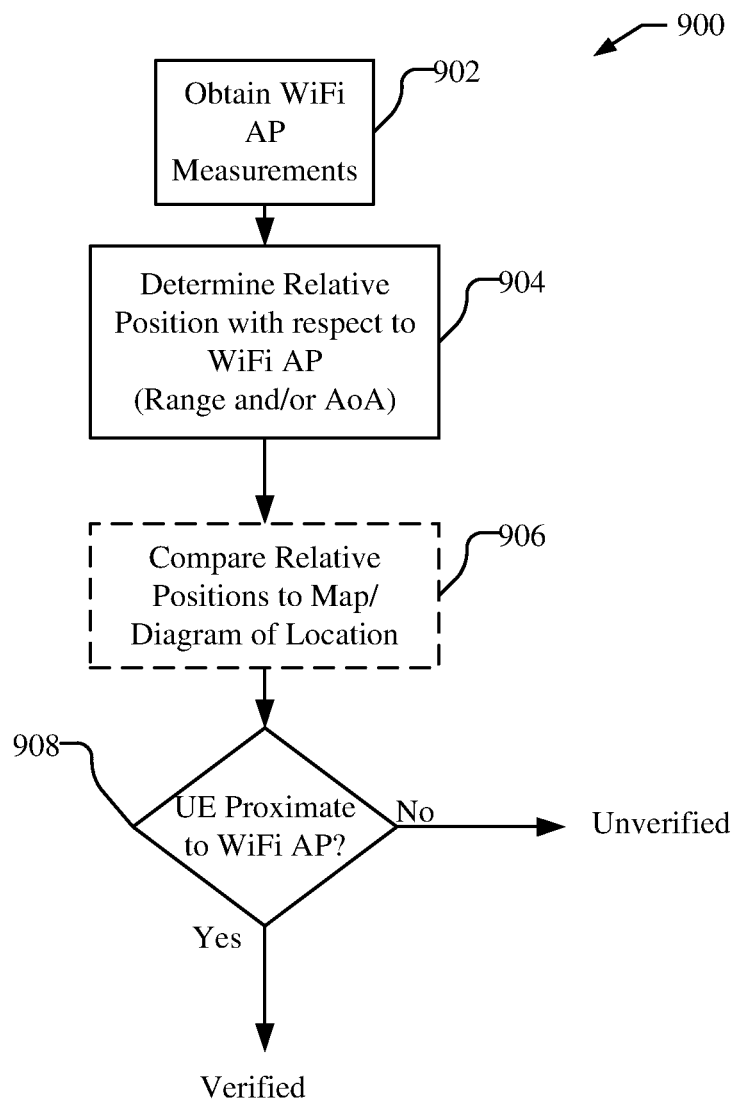
FIG. 9 shows a flow chart illustrating an implementation of verification of a civic location based on a proximity of a UE to a WiFi access point (AP).

FIG. 9 is a flow chart 900 illustrating an implementation of verification of the civic location based on a proximity of the UE 105 to the WiFi AP 115, which may be performed by the location server, e.g., E-SLMC 124, SLP 130, LMF 252, or SLP 262.

As illustrated, at block 902, the location server obtains WiFi AP measurements from the UE 105, e.g., as at stage 11 of FIG. 3 or stage 4 of FIG. 4. The WiFi AP measurements, for example, may be one or more of RSSI, RTT, AOA, or a combination thereof.

At block 904, the location server determines a relative position of the UE 105 with respect to the WiFi AP 115. For example, the RSSI or the RTT measurements may be used to determine a range, i.e., distance, between the UE 105 and WiFi AP 115. The AOA measurements may be used to determine an orientation between the UE 105 and the WiFi AP 115. For example, if an AOA measurement in a horizontal plane is +90° clockwise from North, then, the WiFi AP 115 is to the East of the UE 105.

At block 906, the location server may obtain a map or diagram of the civic location (e.g. a site map, building plan or detailed satellite photo), which is used to evaluate the relative positions of the UE 105 and WiFi AP 115. With use of a map or diagram of a civic location, the location server may determine whether the UE 105 can be at the same location (e.g. in the same building) as the WiFi AP 115. For example, if the distance between the UE 105 and the WiFi AP 115 is greater than the length or width of a structure corresponding to the civic location, then it is unlikely that the UE 105 and the WiFi AP 115 are at the same civic location. Additionally, even if the distance between the UE 105 and the WiFi AP 115 may be accommodated by the structure at the civic location, the orientation between the UE 105 and the WiFi AP 115 as determined by the AOA measurements may provide additional information which may be used to determine whether the UE 105 and the WiFi AP 115 are at the same civic location. For example, returning to the above example with the WiFi AP 115 located to the East of the UE 105, a map or diagram of the civic location may indicate that it is not possible for the WiFi AP 115 to be both located to the East of the UE 105 (e.g., with the determined range) at the same civic location. Instead, the UE 105 might be at a different civic location to the WiFi AP 115 (e.g. in a different building)

At block 908, the location server determines if the UE is proximate to the WiFi AP, e.g., based on the relative positions. The location server determination of proximity may be based on the comparison to the map or diagram from block 906. In other implementations, the relative positions may additionally or alternatively be based on a predetermined distance threshold. For example, the location server may determine if the distance between the UE 105 and WiFi AP 115 is less than a predetermined threshold. For example, the predetermined threshold may be less than 100 meters or 50 meters. Other predetermined thresholds may be used if desired. Moreover, the threshold may be variable based on the type of area. For example, an urban area may have greater building density than a rural area and, thus, an urban area may use a smaller threshold than a rural area for verification. If the UE 105 is determined to be proximate to the WiFi AP 115, the civic location may be considered verified, and if the UE 105 is determined to be not proximate to the WiFi AP 115, the civic location may be considered unverified.

If the location server verifies the civic location using one or both tests, the AP civic location may be used as the civic location for the UE 105. The location server may then provide the civic location to the external client (PSAP) 150, e.g., as discussed at stage 15 of FIG. 3 and stage 8 of FIG. 4. The location server may also provide to the external client (PSAP) 150 a range between the UE 105 and WiFi AP 115 and/or an orientation (e.g. AOA) for the UE 105 and WiFi AP 115 (e.g. as determined at block 904).

Figure 10:
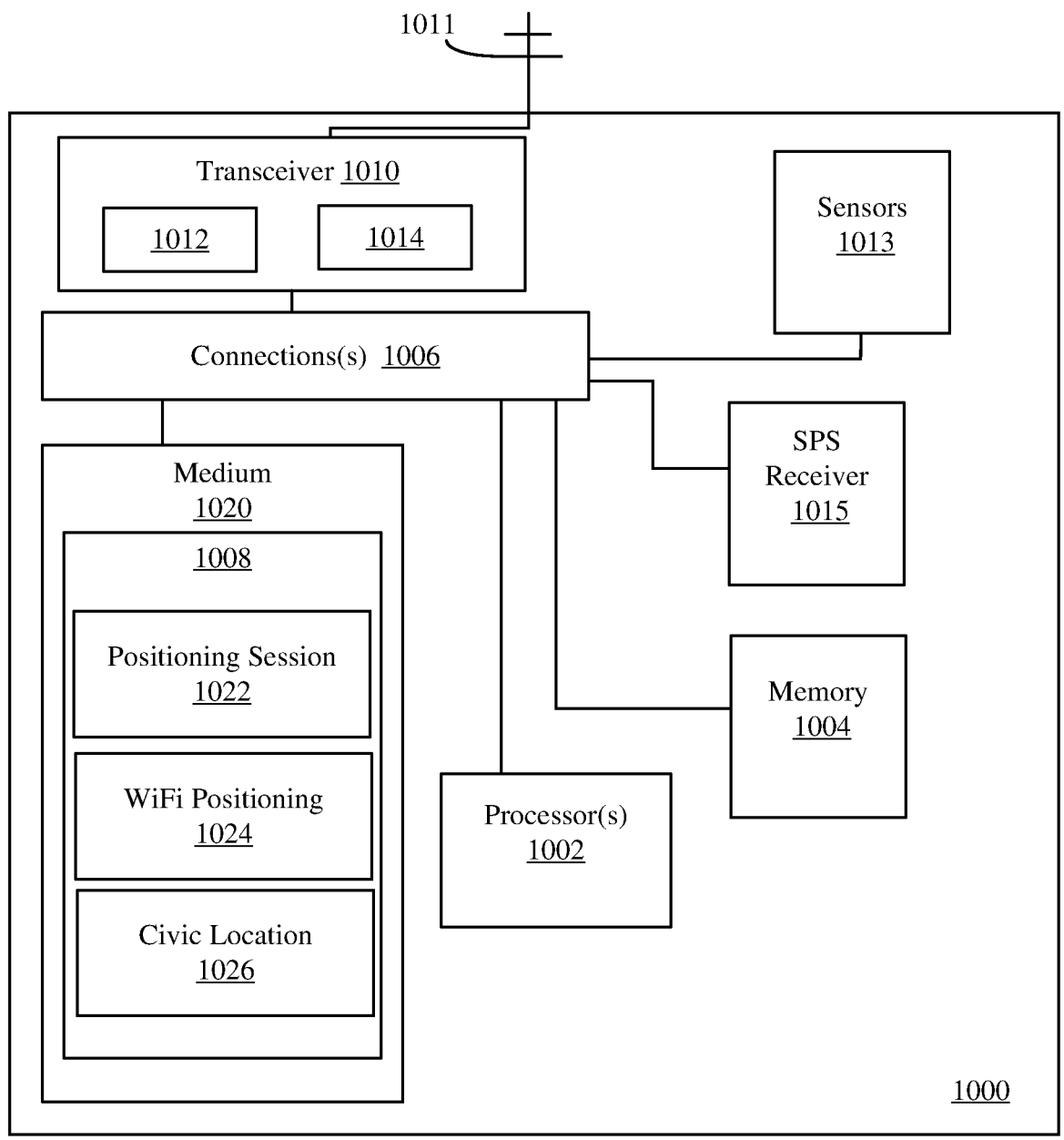
FIG. 10 shows a diagram illustrating an example of a hardware implementation of a UE configured to support civic location determination.

FIG. 10 shows a schematic block diagram illustrating certain exemplary features of a UE 1000, e.g., which may be UE 105 shown in FIGS. 1 and 2, that is configured to support civic location for emergency calls within a mobile wireless network. The UE 1000 may perform the signal flows illustrated in FIGS. 3-5, the procedure 1200 illustrated in FIG. 12, and associated algorithms disclosed herein. The UE 1000 may, for example, include one or more processors 1002, memory 1004, an external interface such as at least one wireless transceiver 1010 (e.g., wireless network interface), SPS receiver 1015, and one or more sensors 1013, which may be operatively coupled with one or more connections 1006 (e.g., buses, lines, fibers, links, etc.) to non-transitory computer readable medium 1020 and memory 1004. The SPS receiver 1015, for example, may receive and process SPS signals from SVs 160 shown in FIGS. 1 and 2. The one or more sensors 1013, for example, may be an inertial measurement unit (IMU) that may include one or more accelerometers, one or more gyroscopes, a magnetometer, etc. to determine the orientation of the UE 1000. The UE 1000 may further include additional items, which are not shown, such as a user interface that may include e.g., a display, a keypad or other input device, such as virtual keypad on the display, through which a user may interface with the UE. In certain example implementations, all or part of UE 1000 may take the form of a chipset, and/or the like.

The at least one wireless transceiver 1010 may be a transceiver for both a WWAN communication system and a WLAN communication system, or may include separate transceivers for WWAN and WLAN. The wireless transceiver 1010 may include a transmitter 1012 and receiver 1014 coupled to one or more antennas 1011 for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. Thus, the transmitter 1012 may include multiple transmitters that may be discrete components or combined/integrated components, and/or the receiver 1014 may include multiple receivers that may be discrete components or combined/integrated components. The wireless transceiver 110 may be configured to communicate signals (e.g., with base stations and access points and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The transceiver 1010 may be communicatively coupled to a transceiver interface, e.g., by optical and/or electrical connection, which may be at least partially integrated with the transceiver 1010.

In some embodiments, UE 1000 may include antenna 1011, which may be internal or external. UE antenna 1011 may be used to transmit and/or receive signals processed by wireless transceiver 1010. In some embodiments, UE antenna 1011 may be coupled to wireless transceiver 1010. In some embodiments, measurements of signals received (transmitted) by UE 1000 may be performed at the point of connection of the UE antenna 1011 and wireless transceiver 1010. For example, the measurement point of reference for received (transmitted) RF signal measurements may be an input (output) terminal of the receiver 1014 (transmitter 1012) and an output (input) terminal of the UE antenna 1011. In a UE 1000 with multiple UE antennas 1011 or antenna arrays, the antenna connector may be viewed as a virtual point representing the aggregate output (input) of multiple UE antennas. In some embodiments, UE 1000 may measure received signals including signal strength and TOA measurements and AOA measurements, e.g., as illustrated in FIG. 7, and the raw measurements may be processed by the one or more processors 1002.

The one or more processors 1002 may be implemented using a combination of hardware, firmware, and software. For example, the one or more processors 1002 may be configured to perform the functions discussed herein by implementing one or more instructions or program code 1008 on a non-transitory computer readable medium, such as medium 1020 and/or memory 1004. In some embodiments, the one or more processors 1002 may represent one or more circuits configurable to perform at least a portion of a data signal computing procedure or process related to the operation of UE 1000.

The medium 1020 and/or memory 1004 may store instructions or program code 1008 that contain executable code or software instructions that when executed by the one or more processors 1002 cause the one or more processors 1002 to operate as a special purpose computer programmed to perform the techniques disclosed herein. As illustrated in UE 1000, the medium 1020 and/or memory 1004 may include one or more components or modules that may be implemented by the one or more processors 1002 to perform the methodologies described herein. While the components or modules are illustrated as software in medium 1020 that is executable by the one or more processors 1002, it should be understood that the components or modules may be stored in memory 1004 or may be dedicated hardware either in the one or more processors 1002 or off the processors.

A number of software modules and data tables may reside in the medium 1020 and/or memory 1004 and be utilized by the one or more processors 1002 in order to manage both communications and the functionality described herein. It should be appreciated that the organization of the contents of the medium 1020 and/or memory 1004 as shown in UE 1000 is merely exemplary, and as such the functionality of the modules and/or data structures may be combined, separated, and/or be structured in different ways depending upon the implementation of the UE 1000.

The medium 1020 and/or memory 1004 may include a positioning session module 1022 that when implemented by the one or more processors 1002 configures the one or more processors 1002 to engage in a positioning session, including receiving a request for location information from a location server, obtain location measurements for signals transmitted by one or more of base stations and SPS SVs, and to provide location information to the location server.

The medium 1020 and/or memory 1004 may include a WiFi positioning module 1024 that when implemented by the one or more processors 1002 configures the one or more processors 1002 to obtain positioning measurements from one or more a WiFi APs, such as RSSI, RTT, and AOA or a combination thereof. The one or more processors 1002 may be configured to positioning measurements with WiFi APs that the UE 1000 is camped on or to scan for available WiFi APs and to obtain positioning measurements from WiFi APs that are available from the scan. The one or more processors 1002 may be configured to include the positioning measurements from the WiFi AP(s) in the location information reported to the location server.

The medium 1020 and/or memory 1004 may include a civic location module 1026 that when implemented by the one or more processors 1002 configures the one or more processors 1002 to obtain a civic location from a WiFi AP. For example, the one or more processors 1002 may be configured to request a location civic report from a WiFi AP, e.g., via transceiver 1010, and to receive the location civic report from the WiFi AP, e.g., via the transceiver 1010. The one or more processors 1002 may be configured to include the civic location in the location information reported to the location server. Additionally, the one or more processors 1002 may be configured to indicate in the location information report that the civic location information is from a WiFi AP.

The methodologies described herein may be implemented by various means depending upon the application. For example, these methodologies may be implemented in hardware, firmware, software, or any combination thereof. For a hardware implementation, the one or more processors 1002 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1020 or memory 1004 that is connected to and executed by the one or more processors 1002. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1008 on a non-transitory computer readable medium, such as medium 1020 and/or memory 1004. Examples include computer readable media encoded with a data structure and computer readable media encoded with a computer program 1008. For example, the non-transitory computer readable medium including program code 1008 stored thereon may include program code 1008 to support civic location for emergency calls within a mobile wireless network in a manner consistent with disclosed embodiments. Non-transitory computer readable medium 1020 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1008 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 1020, instructions and/or data may be provided as signals on transmission media included in a communication apparatus. For example, a communication apparatus may include a wireless transceiver 1010 having signals indicative of instructions and data. The instructions and data are configured to cause one or more processors to implement the functions outlined in the claims. That is, the communication apparatus includes transmission media with signals indicative of information to perform disclosed functions.

Memory 1004 may represent any data storage mechanism. Memory 1004 may include, for example, a primary memory and/or a secondary memory. Primary memory may include, for example, a random access memory, read only memory, etc. While illustrated in this example as being separate from one or more processors 1002, it should be understood that all or part of a primary memory may be provided within or otherwise co-located/coupled with the one or more processors 1002. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1020. As such, in certain example implementations, the methods and/or apparatuses presented herein may take the form in whole or part of a computer readable medium 1020 that may include computer implementable code 1008 stored thereon, which if executed by one or more processors 1002 may be operatively enabled to perform all or portions of the example operations as described herein. Computer readable medium 1020 may be a part of memory 1004.

Figure 11:
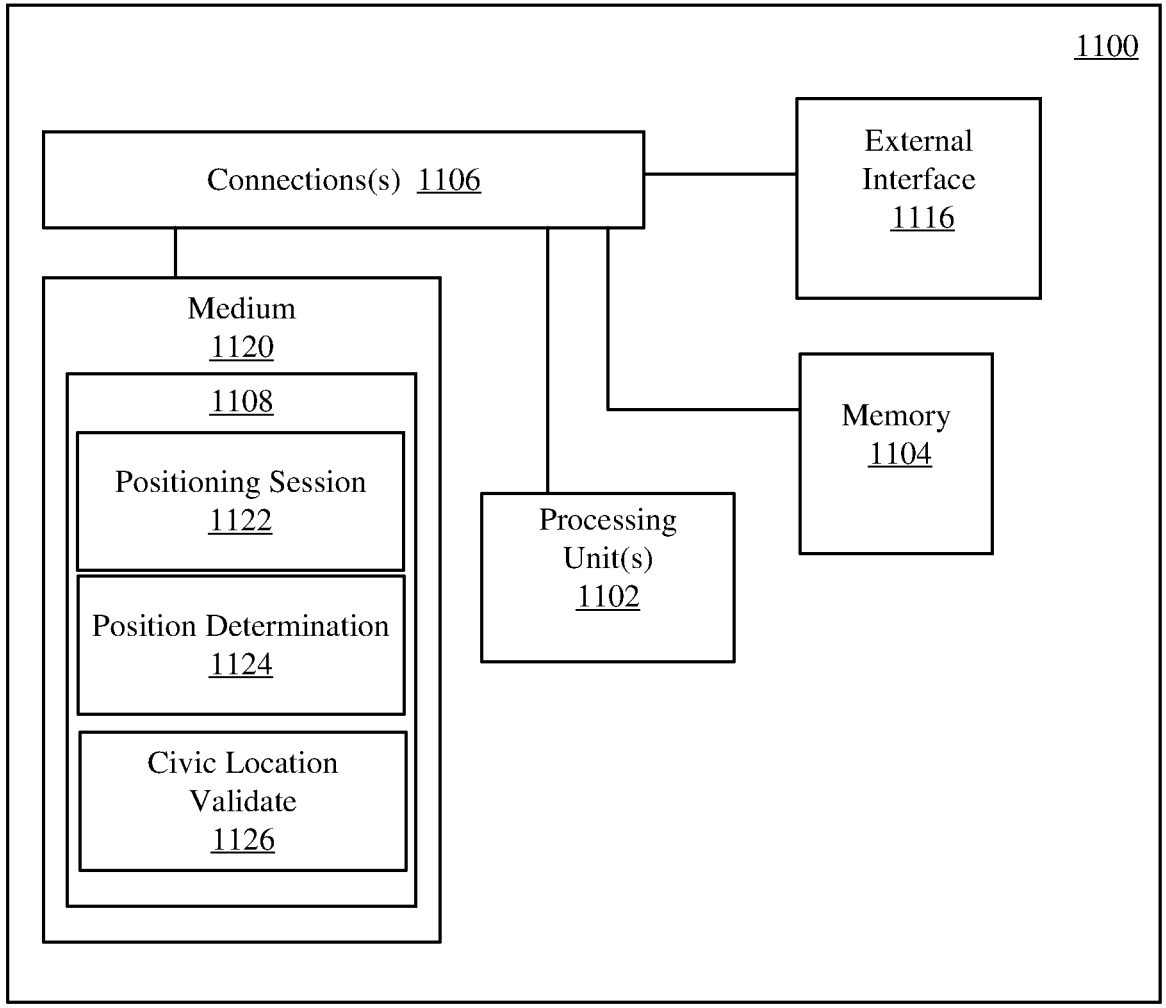
FIG. 11 shows a diagram illustrating an example of a hardware implementation of a location server configured to support civic location determination for a UE.

FIG. 11 shows a schematic block diagram illustrating certain exemplary features of a location server 1100, e.g., E-SLMC 124, SLP 130, LMF 252, or SLP 262, shown in FIGS. 1 and 2, that is configured to support civic location of a UE during an emergency calls within a mobile wireless network perform. The location server 1100 may perform the signal flows illustrated in FIGS. 3 and 4, the procedures 800, 850 and 900 illustrated in FIGS. 8A, 8B, and 9, the procedure 1300 illustrated in FIG. 13, and associated algorithms disclosed herein. Location server 1100 may, for example, include one or more processors 1102, memory 1104, an external interface 1116 (e.g., wireline or wireless network interface to base stations and/or entities in the core network), which may be operatively coupled with one or more connections 1106 (e.g., buses, lines, fibers, links, etc.) to non-transitory computer readable medium 1120 and memory 1104. In certain example implementations, all or part of location server 1100 may take the form of a chipset, and/or the like.

The one or more processors 1102 may be implemented using a combination of hardware, firmware, and software. For example, the one or more processors 1102 may be configured to perform the functions discussed herein by implementing one or more instructions or program code 1108 on a non-transitory computer readable medium, such as medium 1120 and/or memory 1104. In some embodiments, the one or more processors 1102 may represent one or more circuits configurable to perform at least a portion of a data signal computing procedure or process related to the operation of location server 1100.

The medium 1120 and/or memory 1104 may store instructions or program code 1108 that contain executable code or software instructions that when executed by the one or more processors 1102 cause the one or more processors 1102 to operate as a special purpose computer programmed to perform the techniques disclosed herein. As illustrated in location server 1100, the medium 1120 and/or memory 1104 may include one or more components or modules that may be implemented by the one or more processors 1102 to perform the methodologies described herein. While the components or modules are illustrated as software in medium 1120 that is executable by the one or more processors 1102, it should be understood that the components or modules may be stored in memory 1104 or may be dedicated hardware either in the one or more processors 1102 or off the processors.

A number of software modules and data tables may reside in the medium 1120 and/or memory 1104 and be utilized by the one or more processors 1102 in order to manage both communications and the functionality described herein. It should be appreciated that the organization of the contents of the medium 1120 and/or memory 1104 as shown in location server 1100 is merely exemplary, and as such the functionality of the modules and/or data structures may be combined, separated, and/or be structured in different ways depending upon the implementation of the location server 1100.

The medium 1120 and/or memory 1104 may include a positioning session module 1122 that when implemented by the one or more processors 1102 configures the one or more processors 1102 to engage in a positioning session, including receiving a location request for a UE that originated from an externa client such as a PSAP, sending a request for location information to the UE, receiving location information from the UE, and sending the location to the external client. The location information received from the UE may include SPS and/or base station positioning measurements from the UE and/or a position estimate from the UE, along with a civic location obtained by the UE. The location information may further include WiFi AP positioning measurements from the UE.

The medium 1120 and/or memory 1104 may include a positioning determination module 1124 that when implemented by the one or more processors 1102 configures the one or more processors 1102 to determine a position estimate for the UE using the location information received from the UE. The position estimate, for example, may be a geodetic location. The one or more processors 1102 may be further configured to determine a relative position (e.g., range and/or orientation) of the UE with respect to the WiFi AP based on the WiFi positioning measurements received in the location information.

The medium 1120 and/or memory 1104 may include a civic location validation module 1126 that when implemented by the one or more processors 1102 configures the one or more processors 1102 to validate the civic location received in the location information, e.g., using the estimated geodetic location and/or using the relative position of the UE with respect to the WiFi AP. The one or more processors 1102 may be further configured to obtain and use a map or diagram of the civic location to use with the relative position of the UE with respect to the WiFi AP for validation of the civic location. The one or more processors 1102 may be configured to send the civic location to the external client if the civic location is validated.

The methodologies described herein may be implemented by various means depending upon the application. For example, these methodologies may be implemented in hardware, firmware, software, or any combination thereof. For a hardware implementation, the one or more processors 1102 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1120 or memory 1104 that is connected to and executed by the one or more processors 1102. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1108 on a non-transitory computer readable medium, such as medium 1120 and/or memory 1104. Examples include computer readable media encoded with a data structure and computer readable media encoded with a computer program 1108. For example, the non-transitory computer readable medium including program code 1108 stored thereon may include program code 1108 to support civic location of a UE during an emergency calls within a mobile wireless network in a manner consistent with disclosed embodiments. Non-transitory computer readable medium 1120 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1108 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 1120, instructions and/or data may be provided as signals on transmission media included in a communication apparatus. For example, a communication apparatus may include a external interface 1116 having signals indicative of instructions and data. The instructions and data are configured to cause one or more processors to implement the functions outlined in the claims. That is, the communication apparatus includes transmission media with signals indicative of information to perform disclosed functions.

Memory 1104 may represent any data storage mechanism. Memory 1104 may include, for example, a primary memory and/or a secondary memory. Primary memory may include, for example, a random access memory, read only memory, etc. While illustrated in this example as being separate from one or more processors 1102, it should be understood that all or part of a primary memory may be provided within or otherwise co-located/coupled with the one or more processors 1102. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1120. As such, in certain example implementations, the methods and/or apparatuses presented herein may take the form in whole or part of a computer readable medium 1120 that may include computer implementable code 1108 stored thereon, which if executed by one or more processors 1102 may be operatively enabled to perform all or portions of the example operations as described herein. Computer readable medium 1120 may be a part of memory 1104.

Figure 12:
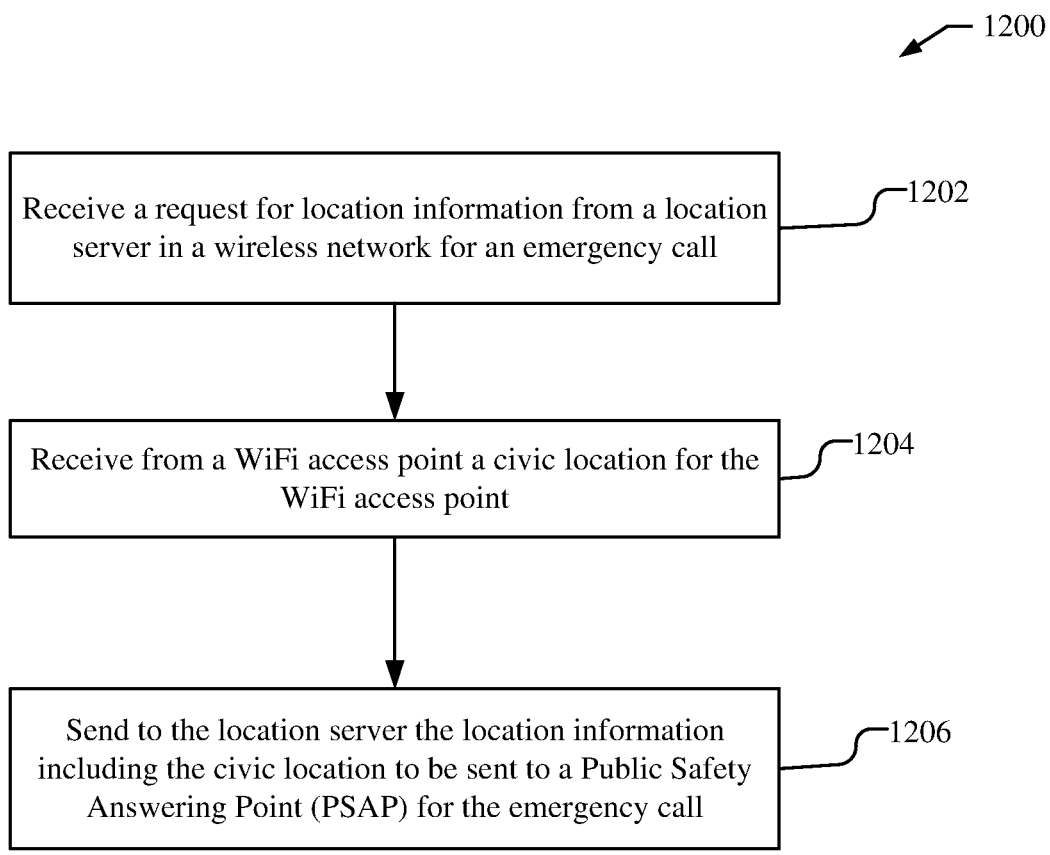
FIG. 12 shows a flowchart for an exemplary method for supporting location services for a UE performed by the UE.

FIG. 12 shows a flowchart for an exemplary method 1200 for supporting location services for a user equipment (UE) performed by the UE, such as UE 105, in a manner consistent with disclosed implementations.

At block 1202, the UE receives a request for location information from a location server (e.g. an E-SLMC 124, SLP 130, LMF 252, or SLP 262) in a wireless network for an emergency call, e.g., as discussed at stage 9 of FIG. 3 and stage 4 of FIG. 4. A means for receiving a request for location information from a location server in a wireless network for an emergency call may include, e.g., the wireless transceiver 1010 and one or more processors 1002 with dedicated hardware or implementing executable code or software instructions in memory 1004 and/or medium 1020 in UE 1000, such as the positioning session module 1022, shown in FIG. 10.

At block 1204, the UE receives from a WiFi access point a civic location for the WiFi access point, e.g., as discussed at stage 10 of FIG. 3, stage 4 of FIG. 4 and shown in FIG. 5. A means for receiving from a WiFi access point a civic location for the WiFi access point may include, e.g., the wireless transceiver 1010 and one or more processors 1002 with dedicated hardware or implementing executable code or software instructions in memory 1004 and/or medium 1020 in UE 1000, such as the civic location module 1026, shown in FIG. 10. For example, the UE may receive the civic location for the WiFi access point by sending a request for a location civic report to the WiFi access point, and receiving a Fine Timing Measurement frame from the WiFi access point that includes the location civic report that includes the civic location of the WiFi access point, e.g., as discussed in reference to the initial FTM request and FTM_3 frame in FIG. 5. A means for sending a request for a location civic report to the WiFi access point may include, e.g., the wireless transceiver 1010 and one or more processors 1002 with dedicated hardware or implementing executable code or software instructions in memory 1004 and/or medium 1020 in UE 1000, such as the civic location module 1026, shown in FIG. 10. A means for receiving a Fine Timing Measurement frame from the WiFi access point that includes the location civic report that includes the civic location of the WiFi access point may include, e.g., the wireless transceiver 1010 and one or more processors 1002 with dedicated hardware or implementing executable code or software instructions in memory 1004 and/or medium 1020 in UE 1000, such as the civic location module 1026, shown in FIG. 10.

At block 1206, the UE sends to the location server the location information including the civic location to be sent to a Public Safety Answering Point (PSAP) for the emergency call, e.g., as discussed at stage 11 of FIG. 3 and stage 4 of FIG. 4. The location information, for example, may include an indication that the civic location was received by the UE from a WiFi access point. A means for sending to the location server the location information including the civic location to be sent to a Public Safety Answering Point (PSAP) for the emergency call may include, e.g., the wireless transceiver 1010 and one or more processors 1002 with dedicated hardware or implementing executable code or software instructions in memory 1004 and/or medium 1020 in UE 1000, such as the positioning session module 1022, shown in FIG. 10.

In some implementations, the UE may further scan for WiFi access points, and send a request for civic location to scanned WiFi access points, wherein the scanned WiFi access points include the WiFi access point, e.g., as discussed in FIG. 5. The UE may receive the civic location from at least the WiFi access point, e.g., as discussed in FIG. 5. A means for scanning for WiFi access points may include, e.g., the wireless transceiver 1010 and one or more processors 1002 with dedicated hardware or implementing executable code or software instructions in memory 1004 and/or medium 1020 in UE 1000, such as the WiFi positioning module 1024, shown in FIG. 10. A means for sending a request for civic location to scanned WiFi access points, wherein the scanned WiFi access points includes the WiFi access point may include, e.g., the wireless transceiver 1010 and one or more processors 1002 with dedicated hardware or implementing executable code or software instructions in memory 1004 and/or medium 1020 in UE 1000, such as the civic location module 1026, shown in FIG. 10. A means for receiving a civic location from at least the WiFi access point may include, e.g., the wireless transceiver 1010 and one or more processors 1002 with dedicated hardware or implementing executable code or software instructions in memory 1004 and/or medium 1020 in UE 1000, such as the civic location module 1026, shown in FIG. 10.

In some implementations, the UE may obtain location measurements for signals transmitted by the WiFi access point, wherein the location information includes the location measurements, e.g., as discussed in FIGS. 5 and 7. The location measurements for signals transmitted by the WiFi access point, for example may be at least one of Round Trip Time (RTT), Received Signal Strength Indicator (RSSI), and Angle of Arrival (AOA). A means for obtaining location measurements for signals transmitted by the WiFi access point, wherein the location information includes the location measurements may include, e.g., the wireless transceiver 1010 and one or more processors 1002 with dedicated hardware or implementing executable code or software instructions in memory 1004 and/or medium 1020 in UE 1000, such as the WiFi positioning module 1024, shown in FIG. 10.

In some implementations, the UE may obtain location measurements for signals transmitted by at least one of a satellite positioning system or base stations in the wireless network or a combination thereof, wherein the location information includes the location measurements, e.g., as discussed in stage 10 of FIG. 3 and stage 4 of FIG. 4. A means for obtaining location measurements for signals transmitted by at least one of a satellite positioning system or base stations in the wireless network or a combination thereof, wherein the location information includes the location measurements may include, e.g., the wireless transceiver 1010, the SPS receiver 1015, and one or more processors 1002 with dedicated hardware or implementing executable code or software instructions in memory 1004 and/or medium 1020 in UE 1000, such as the positioning session module 1022, shown in FIG. 10.

In some implementations, the UE may obtain a first set of location measurements for signals transmitted by the WiFi access point and may obtain a second set of location measurements for signals transmitted by at least one of a satellite positioning system or base stations in the wireless network or a combination thereof. The location information may include the first set of location measurements and the second set of location measurements. A means for obtaining a first set of location measurements for signals transmitted by the WiFi access point may include, e.g., the wireless transceiver 1010 and one or more processors 1002 with dedicated hardware or implementing executable code or software instructions in memory 1004 and/or medium 1020 in UE 1000, such as the WiFi positioning module 1024, shown in FIG. 10. A means for obtaining a second set of location measurements for signals transmitted by at least one of a satellite positioning system or base stations in the wireless network or a combination thereof may include, e.g., the wireless transceiver 1010 and one or more processors 1002 with dedicated hardware or implementing executable code or software instructions in memory 1004 and/or medium 1020 in UE 1000, such as the positioning session module 1022, shown in FIG. 10.

Figure 13:
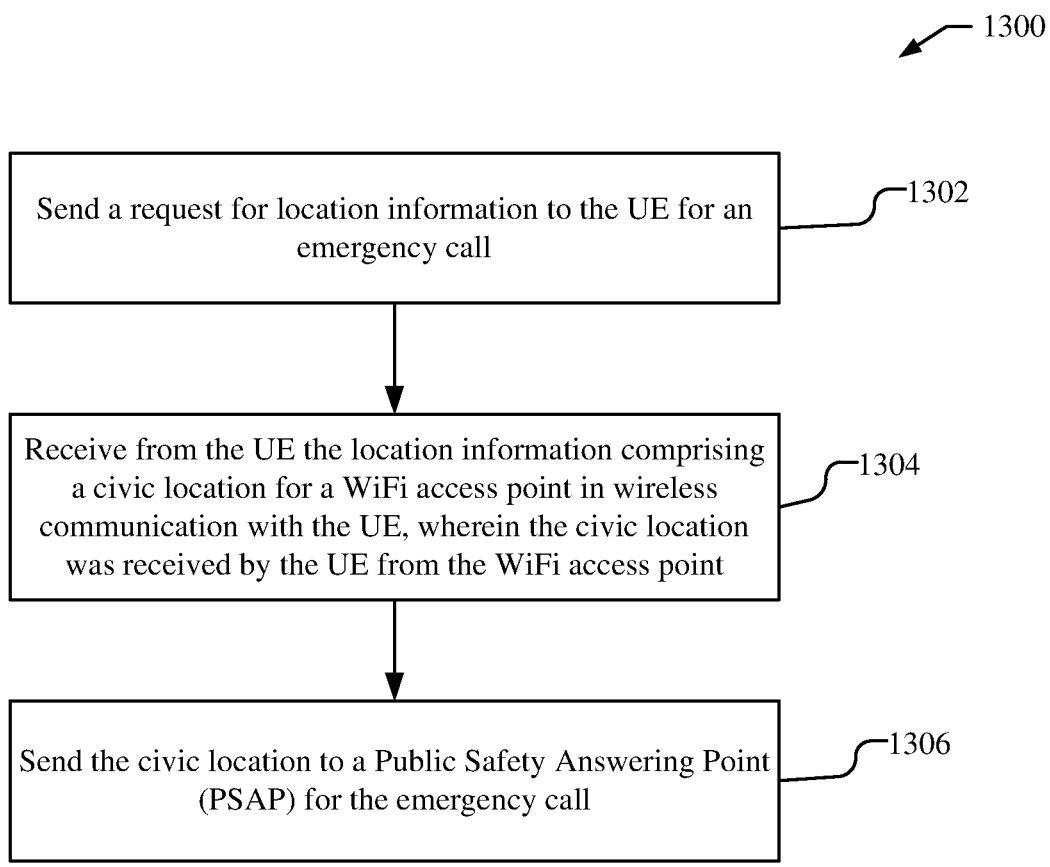
FIG. 13 shows a flowchart for an exemplary method for supporting location services for a UE performed by a location server.

FIG. 13 shows a flowchart for an exemplary method 1300 for supporting location services for a user equipment (e.g. a UE 105) performed by a location server, such as E-SLMC 124, SLP 130, LMF 252, or SLP 262, shown in FIGS. 1 and 2, in a manner consistent with disclosed implementations.

At block 1302, the location server sends a request for location information to the UE for an emergency call, e.g., as discussed at stage 9 of FIG. 3 and stage 4 of FIG. 4. A means for sending a request for location information to the UE for an emergency call may include, e.g., the external interface 1116 and one or more processors 1102 with dedicated hardware or implementing executable code or software instructions in memory 1104 and/or medium 1120 in the location server 1100 shown in FIG. 11.

At block 1304, the location server receives from the UE the location information comprising a civic location for a WiFi access point in wireless communication with the UE, wherein the civic location was received by the UE from the WiFi access point, e.g., as discussed at stage 11 of FIG. 3 or stage 4 of FIG. 4. In one implementation, the location information may further include an indication that the civic location was received by the UE from a WiFi access. A means for receiving from the UE the location information comprising a civic location for a WiFi access point in wireless communication with the UE, wherein the civic location was received by the UE from the WiFi access point may include, e.g., the external interface 1116 and one or more processors 1102 with dedicated hardware or implementing executable code or software instructions in memory 1104 and/or medium 1120 in the location server 1100 shown in FIG. 11.

At block 1306, the location server sends the civic location to a Public Safety Answering Point (PSAP) for the emergency call, e.g., as discussed at stages 13-15 of FIG. 3 or stages 6-8 of FIG. 4. A means for sending the civic location to a Public Safety Answering Point (PSAP) for the emergency call may include, e.g., the external interface 1116 and one or more processors 1102 with dedicated hardware or implementing executable code or software instructions in memory 1104 and/or medium 1120 in the location server 1100 shown in FIG. 11.

In one implementation, the location information may further include geodetic location information based on location measurements obtained by the UE from at least one of a satellite positioning system or base stations in the wireless network or a combination thereof. The location server may further validate the civic location using a geodetic location for the UE obtained based on the geodetic location information received from the UE before sending the civic location to the PSAP, e.g., as discussed at stage 12 of FIG. 3, stage 5 of FIG. 4 and for FIGS. 8A and 8B. In one implementation, the geodetic location information may include the geodetic location for the UE determined by the UE or the geodetic location information may include the location measurements obtained by the UE and the location server determines the geodetic location for the UE based on the location measurements, e.g., as discussed at stage 10 of FIG. 3 and stage 4 of FIG. 4. A means for validating the civic location using a geodetic location for the UE obtained based on the geodetic location information received from the UE before sending the civic location to the PSAP may include, e.g., the one or more processors 1102 with dedicated hardware or implementing executable code or software instructions in memory 1104 and/or medium 1120 in the location server 1100 shown in FIG. 11.

In one implementation, the location server may validate the civic location by converting the geodetic location into a second civic location and comparing the civic location received from the UE to the second civic location, wherein the civic location is validated if the civic location and the second civic location satisfy a consistency criterion, e.g., as discussed in FIG. 8A. For example, the consistency criterion may include having a same or an adjacent civic address component that is below a neighborhood level, e.g., a same street and a same street number, or a same street and adjacent street numbers (e.g. where being adjacent can refer to street numbers denoting buildings or portions of a same building that are either next to or nearby (e.g. within 50 meters) to each other). A means for converting the geodetic location into a second civic location may include, e.g., the one or more processors 1102 with dedicated hardware or implementing executable code or software instructions in memory 1104 and/or medium 1120 in the location server 1100 shown in FIG. 11. A means for comparing the civic location received from the UE to the second civic location may include, e.g., the one or more processors 1102 with dedicated hardware or implementing executable code or software instructions in memory 1104 and/or medium 1120 in the location server 1100 shown in FIG. 11.

In one implementation, the location server may validate the civic location by converting the civic location into a second geodetic location and determining a distance between the geodetic location to the second geodetic location, wherein the civic location is validated if the distance between the geodetic location and the second geodetic location is less than a predetermined threshold, e.g., as discussed in FIG. 8B. A means for converting the civic location into a second geodetic location may include, e.g., the one or more processors 1102 with dedicated hardware or implementing executable code or software instructions in memory 1104 and/or medium 1120 in the location server 1100 shown in FIG. 11. A means for determining a distance between the geodetic location to the second geodetic location may include, e.g., the one or more processors 1102 with dedicated hardware or implementing executable code or software instructions in memory 1104 and/or medium 1120 in the location server 1100 shown in FIG. 11.

In one implementation, the location information may further include location measurements obtained by the UE for the WiFi access point. For example, the location measurements obtained by the UE for the WiFi access point may include at least one of Round Trip Time (RTT), Received Signal Strength Indicator (RSSI), and Angle of Arrival (AOA). The location server may further verify a proximity of the UE to the WiFi access point based on the location measurements obtained by the UE from the WiFi access point before sending the civic location to the PSAP, e.g., as discussed at stage 12 of FIG. 3, stage 5 of FIG. 4, and FIG. 9. A means for verifying a proximity of the UE to the WiFi access point based on the location measurements obtained by the UE from the WiFi access point before sending the civic location to the PSAP may include, e.g., the one or more processors 1102 with dedicated hardware or implementing executable code or software instructions in memory 1104 and/or medium 1120 in the location server 1100 shown in FIG. 11.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

In view of this description, embodiments may include different combinations of features. Implementation examples are described in the following numbered clauses:

Clause 1. A method performed for a user equipment (UE) for supporting location services for the UE, comprising: receiving a request for location information from a location server in a wireless network for an emergency call; receiving from a WiFi access point a civic location for the WiFi access point; and sending to the location server the location information including the civic location to be sent to a Public Safety Answering Point (PSAP) for the emergency call.

Clause 2. The method of clause 1, wherein receiving the civic location for the WiFi access point comprises: sending a request for a location civic report to the WiFi access point; and receiving a Fine Timing Measurement frame from the WiFi access point that includes the location civic report that includes the civic location of the WiFi access point.

Clause 3. The method of either of clauses 1 or 2, further comprising: scanning for WiFi access points; sending a request for the civic location to scanned WiFi access points, wherein the scanned WiFi access points includes the WiFi access point; and receiving the civic location from at least the WiFi access point.

Clause 4. The method of any of clauses 1-3, further comprising: obtaining location measurements for signals transmitted by the WiFi access point, wherein the location information includes the location measurements.

Clause 5. The method of clause 4, wherein the location measurements for signals transmitted by the WiFi access point comprise at least one of Round Trip Time (RTT), Received Signal Strength Indicator (RSSI), and Angle of Arrival (AOA).

Clause 6. The method of any of clauses 1-5, further comprising: obtaining location measurements for signals transmitted by at least one of a satellite positioning system or base stations in the wireless network or a combination thereof, wherein the location information includes the location measurements.

Clause 7. The method of any of clauses 1-6, further comprising: obtaining a first set of location measurements for signals transmitted by the WiFi access point; and obtaining a second set of location measurements for signals transmitted by at least one of a satellite positioning system or base stations in the wireless network or a combination thereof; wherein the location information includes the first set of location measurements and the second set of location measurements.

Clause 8. The method of any of clauses 1-7, wherein the location information further comprises an indication that the civic location was received by the UE from the WiFi access point.

Clause 9. A user equipment (UE) configured to support location services for the UE, comprising: at least one wireless transceiver configured to wirelessly communicate with a wireless network; at least one memory; and at least one processor coupled to the at least one wireless transceiver the at least one memory and configured to: receive, via the at least one wireless transceiver, a request for location information from a location server in the wireless network for an emergency call; receive, via the at least one wireless transceiver, from a WiFi access point a civic location for the WiFi access point; and send, via the at least one wireless transceiver, to the location server the location information including the civic location to be sent to a Public Safety Answering Point (PSAP) for the emergency call.

Clause 10. The UE of clause 9, wherein the at least one processor is configured to receive the civic location for the WiFi access point by being configured to: send, via the at least one wireless transceiver, a request for a location civic report to the WiFi access point; and receive, via the at least one wireless transceiver, a Fine Timing Measurement frame from the WiFi access point that includes the location civic report that includes the civic location of the WiFi access point.

Clause 11. The UE of either of clauses 9-10, wherein the at least one processor is further configured to: scan for WiFi access points; send, via the at least one wireless transceiver, a request for the civic location to scanned WiFi access points, wherein the scanned WiFi access points includes the WiFi access point; and receive, via the at least one wireless transceiver, the civic location from at least the WiFi access point.

Clause 12. The UE of any of clauses 9-11, wherein the at least one processor is further configured to: obtain location measurements for signals transmitted by the WiFi access point, wherein the location information includes the location measurements.

Clause 13. The UE of clause 12, wherein the location measurements for signals transmitted by the WiFi access point comprise at least one of Round Trip Time (RTT), Received Signal Strength Indicator (RSSI), and Angle of Arrival (AOA).

Clause 14. The UE of any of clauses 9-13, wherein the at least one processor is further configured to: obtain location measurements for signals transmitted by at least one of a satellite positioning system or base stations in the wireless network or a combination thereof, wherein the location information includes the location measurements.

Clause 15. The UE of any of clauses 9-14, wherein the at least one processor is further configured to: obtain a first set of location measurements for signals transmitted by the WiFi access point; and obtain a second set of location measurements for signals transmitted by at least one of a satellite positioning system or base stations in the wireless network or a combination thereof; wherein the location information includes the first set of location measurements and the second set of location measurements.

Clause 16. The UE of any of clauses 9-15, wherein the location information further comprises an indication that the civic location was received by the UE from the WiFi access point.

Clause 17. A user equipment (UE) for supporting location services for the UE, comprising: means for receiving a request for location information from a location server in a wireless network for an emergency call; means for receiving from a WiFi access point a civic location for the WiFi access point; and means for sending to the location server the location information including the civic location to be sent to a Public Safety Answering Point (PSAP) for the emergency call.

Clause 18. The UE of clause 17, wherein receiving the civic location for the WiFi access point comprises: means for sending a request for a location civic report to the WiFi access point; and means for receiving a Fine Timing Measurement frame from the WiFi access point that includes the location civic report that includes the civic location of the WiFi access point.

Clause 19. The UE of either of clauses 17 or 18, further comprising: means for scanning for WiFi access points; means for sending a request for the civic location to scanned WiFi access points, wherein the scanned WiFi access points includes the WiFi access point; and means for receiving the civic location from at least the WiFi access point.

Clause 20. The UE of any of clauses 17-19, further comprising: means for obtaining location measurements for signals transmitted by the WiFi access point, wherein the location information includes the location measurements.

Clause 21. The UE of clause 20, wherein the location measurements for signals transmitted by the WiFi access point comprise at least one of Round Trip Time (RTT), Received Signal Strength Indicator (RSSI), and Angle of Arrival (AOA).

Clause 22. The UE of any of clauses 17-21, further comprising: means for obtaining location measurements for signals transmitted by at least one of a satellite positioning system or base stations in the wireless network or a combination thereof, wherein the location information includes the location measurements.

Clause 23. The UE of any of clauses 17-22, further comprising: means for obtaining a first set of location measurements for signals transmitted by the WiFi access point; and means for obtaining a second set of location measurements for signals transmitted by at least one of a satellite positioning system or base stations in the wireless network or a combination thereof; wherein the location information includes the first set of location measurements and the second set of location measurements.

Clause 24. The UE of any of clauses 17-23, wherein the location information further comprises an indication that the civic location was received by the UE from the WiFi access point.

Clause 25. A non-transitory computer readable storage medium including program code stored thereon, the program code is operable to configure at least one processor in a user equipment (UE) for supporting location services for the UE, the program code comprising instructions to: receive a request for location information from a location server in a wireless network for an emergency call; receive from a WiFi access point a civic location for the WiFi access point; and send to the location server the location information including the civic location to be sent to a Public Safety Answering Point (PSAP) for the emergency call.

Clause 26. The non-transitory computer readable storage medium of clause 25, wherein the instructions to receive the civic location for the WiFi access point comprises instructions to: send a request for a location civic report to the WiFi access point; and receive a Fine Timing Measurement frame from the WiFi access point that includes the location civic report that includes the civic location of the WiFi access point.

Clause 27. The non-transitory computer readable storage medium of either of clauses 25 or 26, wherein the program code further comprises instructions to: scan for WiFi access points; send a request for the civic location to scanned WiFi access points, wherein the scanned WiFi access points includes the WiFi access point; and receive the civic location from at least the WiFi access point.

Clause 28. The non-transitory computer readable storage medium of any of clauses 25-27, wherein the program code further comprises instructions to: obtain location measurements for signals transmitted by the WiFi access point, wherein the location information includes the location measurements.

Clause 29. The non-transitory computer readable storage medium of clause 28, wherein the location measurements for signals transmitted by the WiFi access point comprise at least one of Round Trip Time (RTT), Received Signal Strength Indicator (RSSI), and Angle of Arrival (AOA).

Clause 30. The non-transitory computer readable storage medium of any of clauses 25-29, wherein the program code further comprises instructions to: obtain location measurements for signals transmitted by at least one of a satellite positioning system or base stations in the wireless network or a combination thereof, wherein the location information includes the location measurements.

Clause 31. The non-transitory computer readable storage medium of any of clauses 25-30, wherein the program code further comprises instructions to: obtain a first set of location measurements for signals transmitted by the WiFi access point; and obtain a second set of location measurements for signals transmitted by at least one of a satellite positioning system or base stations in the wireless network or a combination thereof; wherein the location information includes the first set of location measurements and the second set of location measurements.

Clause 32. The non-transitory computer readable storage medium of any of clauses 25-31, wherein the location information further comprises an indication that the civic location was received by the UE from the WiFi access point.

Clause 33. A method performed by a location server for supporting location services for a user equipment (UE) in a wireless network, comprising: sending a request for location information to the UE for an emergency call; receiving from the UE the location information comprising a civic location for a WiFi access point in wireless communication with the UE, wherein the civic location was received by the UE from the WiFi access point; and sending the civic location to a Public Safety Answering Point (PSAP) for the emergency call.

Clause 34. The method of clause 33, wherein the location information further comprises an indication that the civic location was received by the UE from the WiFi access point.

Clause 35. The method of either of clauses 33 or 34, wherein the location information further comprises geodetic location information based on location measurements obtained by the UE from at least one of a satellite positioning system or base stations in the wireless network or a combination thereof.

Clause 36. The method of clause 35, further comprising validating the civic location using a geodetic location for the UE obtained based on the geodetic location information received from the UE before sending the civic location to the PSAP.

Clause 37. The method of clause 36, wherein the geodetic location information comprises the geodetic location for the UE determined by the UE or the geodetic location information comprises the location measurements obtained by the UE and the location server determines the geodetic location for the UE based on the location measurements.

Clause 38. The method of either of clauses 36 or 37, wherein validating the civic location comprises: converting the geodetic location into a second civic location; comparing the civic location received from the UE to the second civic location; wherein the civic location is validated if the civic location and the second civic location satisfy a consistency criterion.

Clause 39. The method of clause 38, wherein the consistency criterion comprises having a same or an adjacent civic address component that is below a neighborhood level.

Clause 40. The method of either of clauses 36 or 37, wherein validating the civic location comprises: converting the civic location into a second geodetic location; determining a distance between the geodetic location to the second geodetic location; wherein the civic location is validated if the distance between the geodetic location and the second geodetic location is less than a predetermined threshold.

Clause 41. The method of any of clauses 33-40, wherein the location information further comprises location measurements obtained by the UE for the WiFi access point.

Clause 42. The method of clause 41, wherein the location measurements obtained by the UE for the WiFi access point comprise at least one of Round Trip Time (RTT), Received Signal Strength Indicator (RSSI), and Angle of Arrival (AOA).

Clause 43. The method of either of clauses 41 or 42, further comprising verifying proximity of the UE to the WiFi access point based on the location measurements obtained by the UE from the WiFi access point before sending the civic location to the PSAP.

Clause 44. A location server configured to support location services for a user equipment (UE) in a wireless network, comprising: an external interface configured to wirelessly communicate with the wireless network; at least one memory; and at least one processor coupled to the external interface and the at least one memory and configured to: send a request for location information to the UE for an emergency call; receive from the UE the location information comprising a civic location for a WiFi access point in wireless communication with the UE, wherein the civic location was received by the UE from the WiFi access point; and send the civic location to a Public Safety Answering Point (PSAP) for the emergency call.

Clause 45. The location server of clause 44, wherein the location information further comprises an indication that the civic location was received by the UE from the WiFi access point.

Clause 46. The location server of either of clauses 44 or 45, wherein the location information further comprises geodetic location information based on location measurements obtained by the UE from at least one of a satellite positioning system or base stations in the wireless network or a combination thereof.

Clause 47. The location server of clause 46, wherein the at least one processor is further configured to validate the civic location using a geodetic location for the UE obtained based on the geodetic location information received from the UE before sending the civic location to the PSAP.

Clause 48. The location server of clause 47, wherein the geodetic location information comprises the geodetic location for the UE determined by the UE or the geodetic location information comprises the location measurements obtained by the UE and the location server determines the geodetic location for the UE based on the location measurements.

Clause 49. The location server of either of clauses 47 or 48, wherein the at least one processor is configured to validate the civic location by being configured to: convert the geodetic location into a second civic location; compare the civic location received from the UE to the second civic location; wherein the civic location is validated if the civic location and the second civic location satisfy a consistency criterion.

Clause 50. The location server of clause 49, wherein the consistency criterion comprises having a same or an adjacent civic address component that is below a neighborhood level.

Clause 51. The location server of either of clauses 47 or 48, wherein the at least one processor is configured to validate the civic location by being configured to: convert the civic location into a second geodetic location; determine a distance between the geodetic location to the second geodetic location; wherein the civic location is validated if the distance between the geodetic location and the second geodetic location is less than a predetermined threshold.

Clause 52. The location server of any of clauses 44-51, wherein the location information further comprises location measurements obtained by the UE for the WiFi access point.

Clause 53. The location server of clause 52, wherein the location measurements obtained by the UE for the WiFi access point comprise at least one of Round Trip Time (RTT), Received Signal Strength Indicator (RSSI), and Angle of Arrival (AOA).

Clause 54. The location server of either of clauses 52-53, wherein the at least one processor is further configured to verify proximity of the UE to the WiFi access point based on the location measurements obtained by the UE from the WiFi access point before sending the civic location to the PSAP.

Clause 55. A location server configured for supporting location services for a user equipment (UE) in a wireless network, comprising: means for sending a request for location information to the UE for an emergency call; means for receiving from the UE the location information comprising a civic location for a WiFi access point in wireless communication with the UE, wherein the civic location was received by the UE from the WiFi access point; and means for sending the civic location to a Public Safety Answering Point (PSAP) for the emergency call.

Clause 56. The location server of clause 55, wherein the location information further comprises an indication that the civic location was received by the UE from the WiFi access point.

Clause 57. The location server of either of clauses 55 or 56, wherein the location information further comprises geodetic location information based on location measurements obtained by the UE from at least one of a satellite positioning system or base stations in the wireless network or a combination thereof.

Clause 58. The location server of clause 57, further comprising means for validating the civic location using a geodetic location for the UE obtained based on the geodetic location information received from the UE before sending the civic location to the PSAP.

Clause 59. The location server of clause 58, wherein the geodetic location information comprises the geodetic location for the UE determined by the UE or the geodetic location information comprises the location measurements obtained by the UE and the location server determines the geodetic location for the UE based on the location measurements.

Clause 60. The location server of either of clauses 58 or 59, wherein the means for validating the civic location comprises: means for converting the geodetic location into a second civic location; means for comparing the civic location received from the UE to the second civic location; wherein the civic location is validated if the civic location and the second civic location satisfy a consistency criterion.

Clause 61. The location server of clause 60, wherein the consistency criterion comprises having a same or an adjacent civic address component that is below a neighborhood level.

Clause 62. The location server of either of clauses 58 or 59, wherein the means for validating the civic location comprises: means for converting the civic location into a second geodetic location; means for determining a distance between the geodetic location to the second geodetic location; wherein the civic location is validated if the distance between the geodetic location and the second geodetic location is less than a predetermined threshold.

Clause 63. The location server of any of clauses 55-62, wherein the location information further comprises location measurements obtained by the UE for the WiFi access point.

Clause 64. The location server of clause 63, wherein the location measurements obtained by the UE for the WiFi access point comprise at least one of Round Trip Time (RTT), Received Signal Strength Indicator (RSSI), and Angle of Arrival (AOA).

Clause 65. The location server of either of clauses 63 or 64, further comprising means for verifying proximity of the UE to the WiFi access point based on the location measurements obtained by the UE from the WiFi access point before sending the civic location to the PSAP.

Clause 66. A non-transitory computer readable storage medium including program code stored thereon, the program code is operable to configure at least one processor in a location server for supporting location services for a user equipment (UE) in a wireless network, the program code comprising instructions to: send a request for location information to the UE for an emergency call; receive from the UE the location information comprising a civic location for a WiFi access point in wireless communication with the UE, wherein the civic location was received by the UE from the WiFi access point; and send the civic location to a Public Safety Answering Point (PSAP) for the emergency call.

Clause 67. The non-transitory computer readable storage medium of clause 66, wherein the location information further comprises an indication that the civic location was received by the UE from the WiFi access point.

Clause 68. The non-transitory computer readable storage medium of either of clauses 66 or 67, wherein the location information further comprises geodetic location information based on location measurements obtained by the UE from at least one of a satellite positioning system or base stations in the wireless network or a combination thereof.

Clause 69. The non-transitory computer readable storage medium of clause 68, wherein the program code further comprises instructions to validate the civic location using a geodetic location for the UE obtained based on the geodetic location information received from the UE before sending the civic location to the PSAP.

Clause 70. The non-transitory computer readable storage medium of clause 69, wherein the geodetic location information comprises the geodetic location for the UE determined by the UE or the geodetic location information comprises the location measurements obtained by the UE and the location server determines the geodetic location for the UE based on the location measurements.

Clause 71. The non-transitory computer readable storage medium of either of clauses 69 or 70, wherein the instructions to validate the civic location comprise instructions to: convert the geodetic location into a second civic location; compare the civic location received from the UE to the second civic location; wherein the civic location is validated if the civic location and the second civic location satisfy a consistency criterion.

Clause 72. The non-transitory computer readable storage medium of clause 71, wherein the consistency criterion comprises having a same or an adjacent civic address component that is below a neighborhood level.

Clause 73. The non-transitory computer readable storage medium of either of clauses 69 or 70, wherein the instructions to validate the civic location comprise instructions to: convert the civic location into a second geodetic location; determine a distance between the geodetic location to the second geodetic location; wherein the civic location is validated if the distance between the geodetic location and the second geodetic location is less than a predetermined threshold.

Clause 74. The non-transitory computer readable storage medium of any of clauses 66-73, wherein the location information further comprises location measurements obtained by the UE for the WiFi access point.

Clause 75. The non-transitory computer readable storage medium of clause 74, wherein the location measurements obtained by the UE for the WiFi access point comprise at least one of Round Trip Time (RTT), Received Signal Strength Indicator (RSSI), and Angle of Arrival (AOA).

Clause 76. The non-transitory computer readable storage medium of either of clauses 74 or 75, wherein the program code further comprises instructions to verify proximity of the UE to the WiFi access point based on the location measurements obtained Therefore, it is intended that claimed subject matter not be limited to the particular examples disclosed, but that such claimed subject matter may also include all aspects falling within the scope of appended claims, and equivalents thereof.

What is claimed is:

1. A method performed by a user equipment (UE) for supporting location services for the UE, comprising:
   receiving a request for location information from a location server in a wireless network for an emergency call;
   sending a request for a location civic report to a WiFi access point;
   receiving a Fine Timing Measurement frame from the WiFi access point that includes the location civic report that includes a civic location of the WiFi access point; and
   sending to the location server the location information including the civic location to be sent to a Public Safety Answering Point (PSAP) for the emergency call.

2. The method of claim 1, further comprising:
   scanning for WiFi access points;
   sending a request for the civic location to scanned WiFi access points, wherein the scanned WiFi access points includes the WiFi access point; and
   receiving the civic location from at least the WiFi access point.

3. The method of claim 1, further comprising:
   obtaining location measurements for signals transmitted by the WiFi access point, wherein the location information includes the location measurements.

4. The method of claim 1, further comprising:
   obtaining location measurements for signals transmitted by at least one of a satellite positioning system or base stations in the wireless network or a combination thereof, wherein the location information includes the location measurements.

5. The method of claim 1, further comprising:
   obtaining a first set of location measurements for signals transmitted by the WiFi access point; and
   obtaining a second set of location measurements for signals transmitted by at least one of a satellite positioning system or base stations in the wireless network or a combination thereof,
   wherein the location information includes the first set of location measurements and the second set of location measurements.

6. The method of claim 1, wherein the location information further comprises an indication that the civic location was received by the UE from the WiFi access point.

7. A user equipment (UE) configured to support location services for the UE, comprising:
   at least one wireless transceiver configured to wirelessly communicate with a wireless network;
   at least one memory; and
   at least one processor coupled to the at least one wireless transceiver the at least one memory and configured to:
   receive, via the at least one wireless transceiver, a request for location information from a location server in the wireless network for an emergency call;
   send, via the at least one wireless transceiver, a request for a location civic report to a WiFi access point;
   receive, via the at least one wireless transceiver, a Fine Timing Measurement frame from the WiFi access point that includes the location civic report that includes a civic location of the WiFi access point; and send, via the at least one wireless transceiver, to the location server the location information including the civic location to be sent to a Public Safety Answering Point (PSAP) for the emergency call.

8. The UE of claim 7, wherein the at least one processor is further configured to:
   scan for WiFi access points;
   send, via the at least one wireless transceiver, a request for the civic location to scanned WiFi access points, wherein the scanned WiFi access points includes the WiFi access point; and
   receive, via the at least one wireless transceiver, the civic location from at least the WiFi access point.

9. The UE of claim 7, wherein the at least one processor is further configured to:
   obtain location measurements for signals transmitted by the WiFi access point, wherein the location information includes the location measurements.

10. The UE of claim 7, wherein the at least one processor is further configured to:
    obtain location measurements for signals transmitted by at least one of a satellite positioning system or base stations in the wireless network or a combination thereof, wherein the location information includes the location measurements.

11. The UE of claim 7, wherein the at least one processor is further configured to:
    obtain a first set of location measurements for signals transmitted by the WiFi access point; and
    obtain a second set of location measurements for signals transmitted by at least one of a satellite positioning system or base stations in the wireless network or a combination thereof, wherein the location information includes the first set of location measurements and the second set of location measurements.

12. The UE of claim 7, wherein the location information further comprises an indication that the civic location was received by the UE from the WiFi access point.

13. A method performed by a location server for supporting location services for a user equipment (UE) in a wireless network, comprising:
sending a request for location information to the UE for an emergency call;
receiving from the UE the location information comprising a civic location for a WiFi access point in wireless communication with the UE, wherein the civic location was received by the UE from the WiFi access point, and wherein the location information further comprises geodetic location information based on location measurements obtained by the UE from at least one of a satellite positioning system or base stations in the wireless network or a combination thereof;
sending the civic location to a Public Safety Answering Point (PSAP) for the emergency call; and
validating the civic location using a geodetic location for the UE obtained based on the geodetic location information received from the UE before sending the civic location to the PSAP.

14. The method of claim 13, wherein the location information further comprises an indication that the civic location was received by the UE from the WiFi access point.

15. The method of claim 13, wherein the geodetic location information comprises the geodetic location for the UE determined by the UE or the geodetic location information comprises the location measurements obtained by the UE and the location server determines the geodetic location for the UE based on the location measurements.

16. The method of claim 13, wherein validating the civic location comprises:
converting the geodetic location into a second civic location;
comparing the civic location received from the UE to the second civic location;
wherein the civic location is validated if the civic location and the second civic location satisfy a consistency criterion.

17. The method of claim 13, wherein validating the civic location comprises:
converting the civic location into a second geodetic location;
determining a distance between the geodetic location to the second geodetic location;
wherein the civic location is validated if the distance between the geodetic location and the second geodetic location is less than a predetermined threshold.

18. The method of claim 13, wherein the location information further comprises location measurements obtained by the UE for the WiFi access point.

19. A location server configured to support location services for a user equipment (UE) in a wireless network, comprising:
an external interface configured to wirelessly communicate with the wireless network;
at least one memory; and
at least one processor coupled to the external interface and the at least one memory and configured to:
send, via the external interface, a request for location information to the UE for an emergency call;
receive, via the external interface, from the UE the location information comprising a civic location for a WiFi access point in wireless communication with the UE, wherein the civic location was received by the UE from the WiFi access point, and wherein the location information further comprises geodetic location information based on location measurements obtained by the UE from at least one of a satellite positioning system or base stations in the wireless network or a combination thereof;
send, via the external interface, the civic location to a Public Safety Answering Point (PSAP) for the emergency call; and
validate the civic location using a geodetic location for the UE obtained based on the geodetic location information received from the UE before sending the civic location to the PSAP.

20. The location server of claim 19, wherein the location information further comprises an indication that the civic location was received by the UE from the WiFi access point.

21. The location server of claim 19, wherein the geodetic location information comprises the geodetic location for the UE determined by the UE or the geodetic location information comprises the location measurements obtained by the UE and the location server determines the geodetic location for the UE based on the location measurements.

22. The location server of claim 19, wherein the at least one processor is configured to validate the civic location by being configured to:
convert the geodetic location into a second civic location;
compare the civic location received from the UE to the second civic location;
wherein the civic location is validated if the civic location and the second civic location satisfy a consistency criterion.

23. The location server of claim 19, wherein the at least one processor is configured to validate the civic location by being configured to:
convert the civic location into a second geodetic location;
determine a distance between the geodetic location to the second geodetic location;
wherein the civic location is validated if the distance between the geodetic location and the second geodetic location is less than a predetermined threshold.

24. The location server of claim 19, wherein the location information further comprises location measurements obtained by the UE for the WiFi access point.

* * * * *